(12) United States Patent
Gagliardi

(10) Patent No.: US 9,411,616 B2
(45) Date of Patent: Aug. 9, 2016

(54) CLASSLOADER/INSTRUMENTATION APPROACH FOR INVOKING NON-BOUND LIBRARIES

(75) Inventor: Marco Gagliardi, Brisbane, CA (US)

(73) Assignee: CA, Inc., New York, NY (US)

( * ) Notice: Subject to any disclaimer, the term of this patent is extended or adjusted under 35 U.S.C. 154(b) by 1194 days.

(21) Appl. No.: 13/315,917

(22) Filed: Dec. 9, 2011

(65) Prior Publication Data

US 2013/0152064 A1 Jun. 13, 2013

(51) Int. Cl.
*G06F 9/445* (2006.01)
*G06F 9/44* (2006.01)

(52) U.S. Cl.
CPC .................................. *G06F 9/44521* (2013.01)

(58) Field of Classification Search
CPC .......... G06F 2201/865; G06F 11/3466; G06F 11/3644; G06F 11/3612; G06F 11/3419; G06F 9/52; G06F 9/526
USPC ......................................................... 717/166
See application file for complete search history.

(56) References Cited

U.S. PATENT DOCUMENTS

| | | | | |
|---|---|---|---|---|
| 5,515,536 | A * | 5/1996 | Corbett et al. | 719/315 |
| 5,689,709 | A * | 11/1997 | Corbett et al. | 719/315 |
| 5,842,020 | A * | 11/1998 | Faustini | 717/111 |
| 6,067,577 | A * | 5/2000 | Beard | 719/331 |
| 6,077,311 | A * | 6/2000 | Lichtenstein et al. | 717/128 |
| 6,470,494 | B1 | 10/2002 | Chan et al. | |
| 6,513,158 | B1 * | 1/2003 | Yogaratnam | 717/166 |
| 6,910,128 | B1 * | 6/2005 | Skibbie et al. | 713/170 |
| 6,931,544 | B1 * | 8/2005 | Kienhofer et al. | 717/118 |
| 6,985,909 | B2 | 1/2006 | Blohm | |
| 7,017,155 | B2 | 3/2006 | Peev et al. | |
| 7,058,929 | B2 * | 6/2006 | Charnell | G06F 8/4442 711/E12.011 |
| 7,058,957 | B1 | 6/2006 | Nguyen | |
| 7,206,807 | B2 | 4/2007 | Cheenath | |
| 7,293,260 | B1 | 11/2007 | Dmitriev | |
| 7,398,533 | B1 | 7/2008 | Slaughter et al. | |
| 7,437,359 | B2 | 10/2008 | Aguilar-Macias et al. | |
| 7,469,262 | B2 | 12/2008 | Baskaran et al. | |
| 7,483,927 | B2 | 1/2009 | Anglin et al. | |

(Continued)

FOREIGN PATENT DOCUMENTS

| | | | |
|---|---|---|---|
| JP | H10-320223 A | 12/1998 | |
| JP | 2004-005230 A | 1/2004 | |

(Continued)

OTHER PUBLICATIONS

U.S. Appl. No. 12/777,490, filed May 11, 2010.

(Continued)

*Primary Examiner* — Chat Do
*Assistant Examiner* — Sergio J Curbelo, III
(74) *Attorney, Agent, or Firm* — Vierra Magen Marcus LLP

(57) ABSTRACT

An agent object can invoke one or more methods of an application object using a helper object. The application object passes a reference to itself to the agent object. The agent object identifies a class loader of the application from the reference. The agent object obtains byte code of a helper class and uses the byte code of the helper class to creating a helper class loader. A parent of the helper class loader is set as the class loader of the application. The helper class loader is used to load the helper class and define an instance of the helper object. Using the helper object, the one or more methods of the application object are invoked by the agent using casting, without having a direct class loader connection with the class loader of the application.

20 Claims, 14 Drawing Sheets

(56) References Cited

U.S. PATENT DOCUMENTS

| | | | |
|---|---|---|---|
| 7,546,593 B2 | 6/2009 | Petev et al. | |
| 7,571,427 B2 | 8/2009 | Wang et al. | |
| 7,603,664 B2 | 10/2009 | Dutt et al. | |
| 7,614,045 B2 | 11/2009 | Kuck et al. | |
| 7,882,501 B1* | 2/2011 | Carlson et al. | 717/167 |
| 8,245,210 B2 | 8/2012 | Ng et al. | |
| 8,359,582 B2 | 1/2013 | Elliott | |
| 8,555,259 B2 | 10/2013 | Krauss | |
| 2002/0184226 A1* | 12/2002 | Klicnik et al. | 707/100 |
| 2002/0188584 A1* | 12/2002 | Ghannam et al. | 707/1 |
| 2002/0199172 A1 | 12/2002 | Bunnell | |
| 2003/0101438 A1* | 5/2003 | Mishra et al. | 717/136 |
| 2003/0115584 A1 | 6/2003 | Fahs et al. | |
| 2003/0135847 A1 | 7/2003 | Gouriou et al. | |
| 2003/0149960 A1 | 8/2003 | Inamdar | |
| 2003/0163608 A1 | 8/2003 | Tiwary et al. | |
| 2004/0015936 A1* | 1/2004 | Susarla et al. | 717/166 |
| 2004/0019887 A1* | 1/2004 | Taylor et al. | 717/166 |
| 2004/0047302 A1* | 3/2004 | Dezonno et al. | 370/270 |
| 2004/0078691 A1 | 4/2004 | Cirne et al. | |
| 2004/0136325 A1* | 7/2004 | Dobric et al. | 370/241 |
| 2004/0158589 A1* | 8/2004 | Liang et al. | 707/206 |
| 2005/0039172 A1 | 2/2005 | Rees et al. | |
| 2005/0076343 A1* | 4/2005 | Kammhuber | 719/316 |
| 2005/0240858 A1 | 10/2005 | Croft et al. | |
| 2005/0261879 A1 | 11/2005 | Shrivastava et al. | |
| 2005/0273667 A1 | 12/2005 | Shrivastava et al. | |
| 2005/0273787 A1 | 12/2005 | Kovachka-Dimitrova et al. | |
| 2006/0174226 A1 | 8/2006 | Fair et al. | |
| 2006/0218533 A1 | 9/2006 | Koduru et al. | |
| 2006/0248140 A1* | 11/2006 | Birenheide | 709/203 |
| 2007/0150870 A1 | 6/2007 | Fitch et al. | |
| 2007/0168998 A1 | 7/2007 | Mehta et al. | |
| 2007/0234307 A1 | 10/2007 | Luk et al. | |
| 2007/0283331 A1 | 12/2007 | Pietrek | |
| 2008/0005726 A1 | 1/2008 | Collard | |
| 2008/0034352 A1 | 2/2008 | McKinney et al. | |
| 2008/0127155 A1* | 5/2008 | Abdelhadi | G06F 9/44552 717/166 |
| 2008/0148242 A1 | 6/2008 | Cobb et al. | |
| 2008/0222614 A1 | 9/2008 | Chilimbi et al. | |
| 2008/0276227 A1 | 11/2008 | Greifeneder | |
| 2008/0288212 A1 | 11/2008 | Greifeneder | |
| 2008/0288962 A1 | 11/2008 | Greifeneder | |
| 2009/0013210 A1 | 1/2009 | McIntosh et al. | |
| 2009/0063595 A1* | 3/2009 | Stoodley | 707/206 |
| 2009/0106746 A1 | 4/2009 | Chaudhuri et al. | |
| 2009/0112667 A1 | 4/2009 | Blackwell et al. | |
| 2009/0144305 A1 | 6/2009 | Little | |
| 2009/0150875 A1* | 6/2009 | Maier et al. | 717/158 |
| 2009/0254889 A1 | 10/2009 | Prasadarao | |
| 2009/0271769 A1 | 10/2009 | Krauss | |
| 2009/0282125 A1 | 11/2009 | Jeide et al. | |
| 2009/0320045 A1 | 12/2009 | Griffith et al. | |
| 2010/0131930 A1 | 5/2010 | Ben-Chaim et al. | |
| 2010/0153939 A1 | 6/2010 | Stall et al. | |
| 2010/0199259 A1* | 8/2010 | Quinn et al. | 717/106 |
| 2010/0257603 A1 | 10/2010 | Chander et al. | |
| 2011/0138368 A1 | 6/2011 | Krauss | |
| 2011/0231819 A1 | 9/2011 | Tanner et al. | |
| 2013/0145349 A1 | 6/2013 | Basak et al. | |
| 2013/0179868 A1 | 7/2013 | Greifeneder et al. | |

FOREIGN PATENT DOCUMENTS

| | | |
|---|---|---|
| JP | 2004-264914 A | 9/2004 |
| JP | 2006-018710 A | 1/2006 |
| JP | 2008-217721 A | 9/2008 |
| JP | 2009-294837 A | 12/2009 |
| JP | 2010-033543 A | 2/2010 |
| WO | WO2009/095741 | 8/2009 |

OTHER PUBLICATIONS

U.S. Appl. No. 12/777,496, filed May 11, 2010.
U.S. Appl. No. 12/777,506, filed May 11, 2010.
Dmitriev, "Design of Jfluid: A Profiling Technology and Tool Based on Dynamic Bytecode Instrumentation," SMLI TR-2003-125, Nov. 17, 2003, Sun Microsystems, Inc., pp. 1-19.
Binder et al., "Advanced Java Bytecode Instrumentation," PPPJ 2007, Sep. 5-7, 2007, Lisboa, Portugal, Copyright 2007 ACM.
Extended European Search Report dated Aug. 16, 2011, European Patent Application No. 11250520.1-1225.
Morajko et al., "Design and implementation of a dynamic tuning environment," Journal of Parallel and Distributed Computing, vol. 67, No. 4, Mar. 24, 2007, pp. 474-490.
Extended European Search Report dated Sep. 1, 2011, European Patent Application No. 11250522.7-1225.
Extended European Search Report dated Sep. 19, 2011, European Patent Application No. 11250521.9-1225.
Response to the Search Opinion of the Extended European Search Report dated Oct. 28, 2011, European Patent Application No. 11250522.7.
Non-Final Office Action dated Dec. 6, 2012, U.S. Appl. No. 12/777,490, filed May 11, 2010.
Non-Final Office Action dated Dec. 28, 2012, U.S. Appl. No. 12/777,496, filed May 11, 2010.
Non-Final Office Action dated Jan. 2, 2013, U.S. Appl. No. 12/777,506, filed May 11, 2010.
Mirgorodskiy, Alexander V., et al., "CrossWalk: A tool for performance profiling across the user-kernel boundary," Advances in Parallel Computing, vol. 13, 2004, pp. 745-752.
Response to Office Action dated Mar. 6, 2013, U.S. Appl. No. 12/777,490, filed May 11, 2010.
Notice of Allowance and Fee(s) Due dated Mar. 19, 2013, U.S. Appl. No. 12/777,490, filed May 11, 2010.
Response to Office Action dated Mar. 27, 2013, U.S. Appl. No. 12/777,496, filed May 11, 2010.
Response to Office Action dated Apr. 1, 2013, U.S. Appl. No. 12/777,506, filed May 11, 2010.
Final Office Action dated May 15, 2013, U.S. Appl. No. 12/777,506, filed May 11, 2010.
Notice of Allowance dated May 14, 2014, U.S. Appl. No. 12/777,506, filed May 11, 2010.
Olszeweski, Marek, et al., "JIT Instrumentation—A Novel Approach to Dynamically Instrument Operating Systems," Mar. 2007, pp. 1-11.
Thiffault, Christian, "Dynamic Instrumentation of Large-Scale MPI and OpenMP Applications," International Proceedings on Parallel and Distributed Processing Symposium, Apr. 2003, pp. 1-7.
Nethercote, Nicholas, "Dynamic binary analysis and instrumentation," Technical report published by University of Cambridge, Nov. 2004, pp. 11-13 and 17-31.
Response to Extended European Search Report dated May 16, 2012, European Patent Application No. 11250521.9.
Notice of Allowance and Fee(s) Due dated Jun. 25, 2013, U.S. Appl. No. 12/777,496, filed May 11, 2010.
Japanese Office Action dated Oct. 28, 2014, Japanese Patent Application No. 2011-104685.
Japanese Office Action dated Oct. 28, 2014, Japanese Patent Application No. 2011-104690.
Akihiro Ohshima, "Development of OS debug support function by virtual computer," Computer Symposium collection of papers, Information Processing Society of Japan, Nov. 15, 2000, vol. 2000, No. 13, pp. 61-68. (with English Abstract).
English Abstract of Japanese Publication No. JP2008-217721 published on Sep. 18, 2008.
English Abstract of Japanese Publication No. JP2006-018710 published on Jan. 19, 2006.
English Abstract of Japanese Publication No. JP2004-005230 published on Jan. 8, 2004.
English Abstract of Japanese Publication No. JP2004-294837 published on Dec. 17, 2009.
English Abstract of Japanese Publication No. JPH10-320223 published on Dec. 4, 1998.
Response to Search Opinion dated Sep. 5, 2012, European Patent Application No. 11250520.1-1225.
Japanese Office Action dated Apr. 28, 2015, Japanese Patent Application No. 2011-104689.

(56) References Cited

OTHER PUBLICATIONS

English Abstract of Japanese Publication No. JP2010-033543 published Feb. 12, 2010.
English Abstract of Japanese Publication No. JP2004-264914 published Sep. 24, 2004.
Response to Office Action dated Jul. 17, 2015, Japanese Patent Application No. 2011-104689.
English translation of claims amendments filed in Response to Office Action dated Jul. 17, 2015, Japanese Patent Application No. 2011-104689.

* cited by examiner

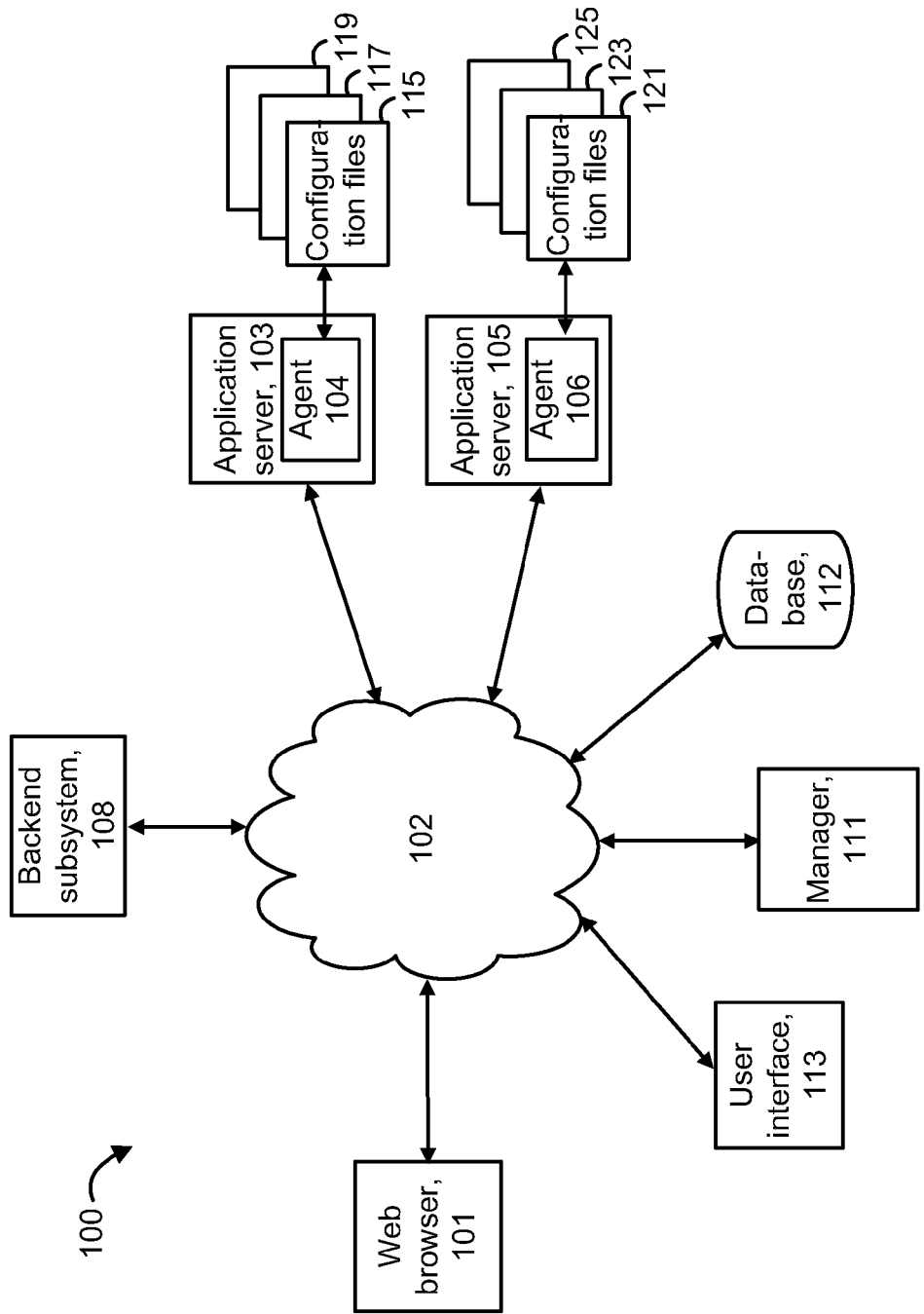

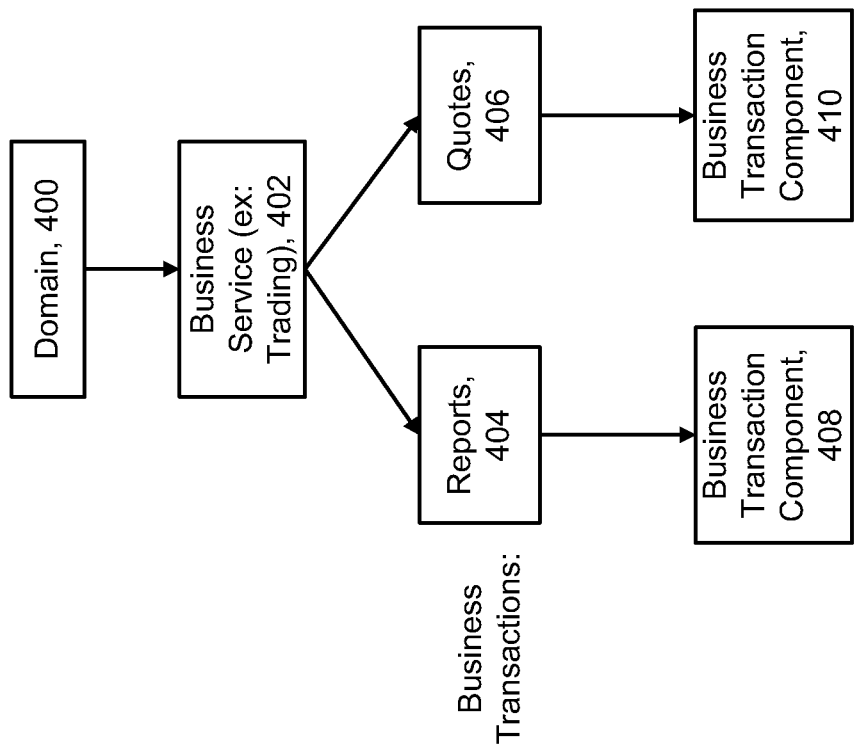

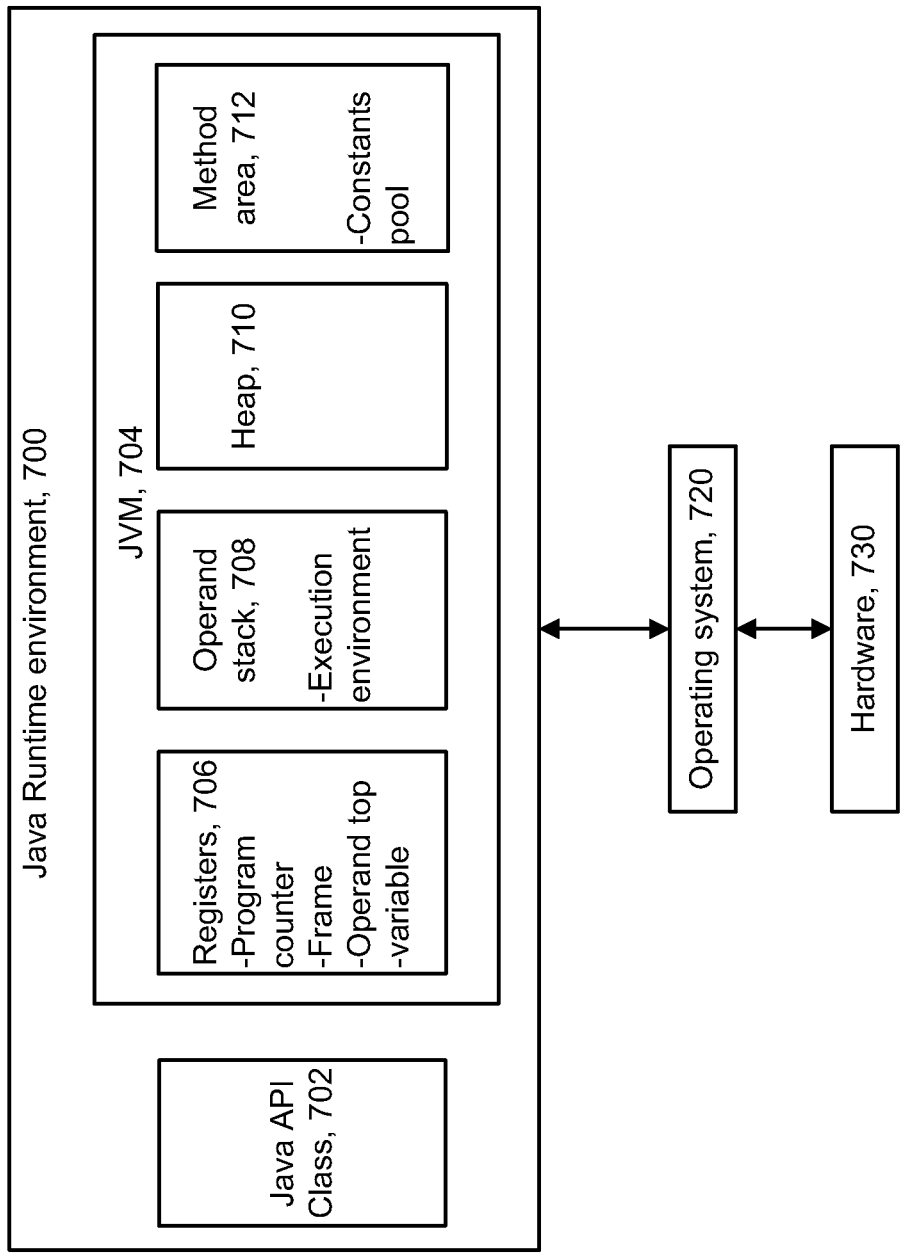

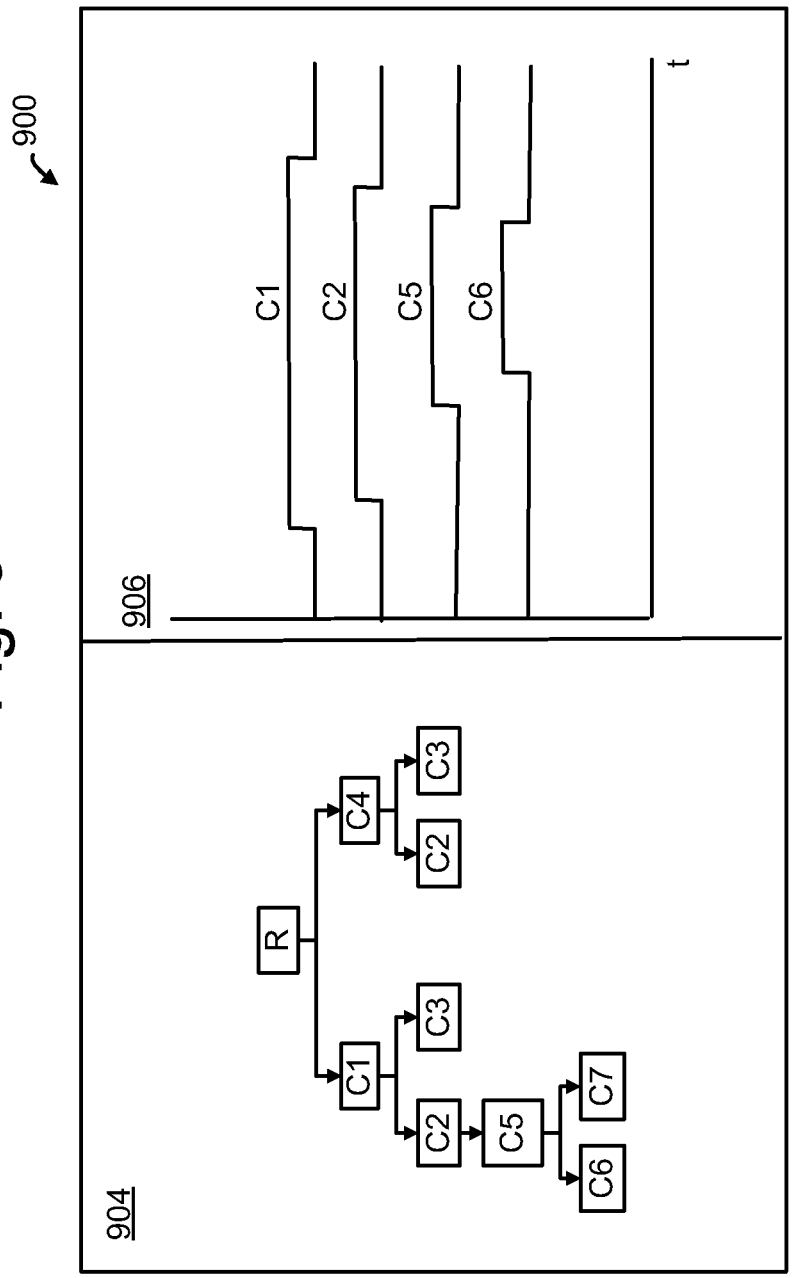

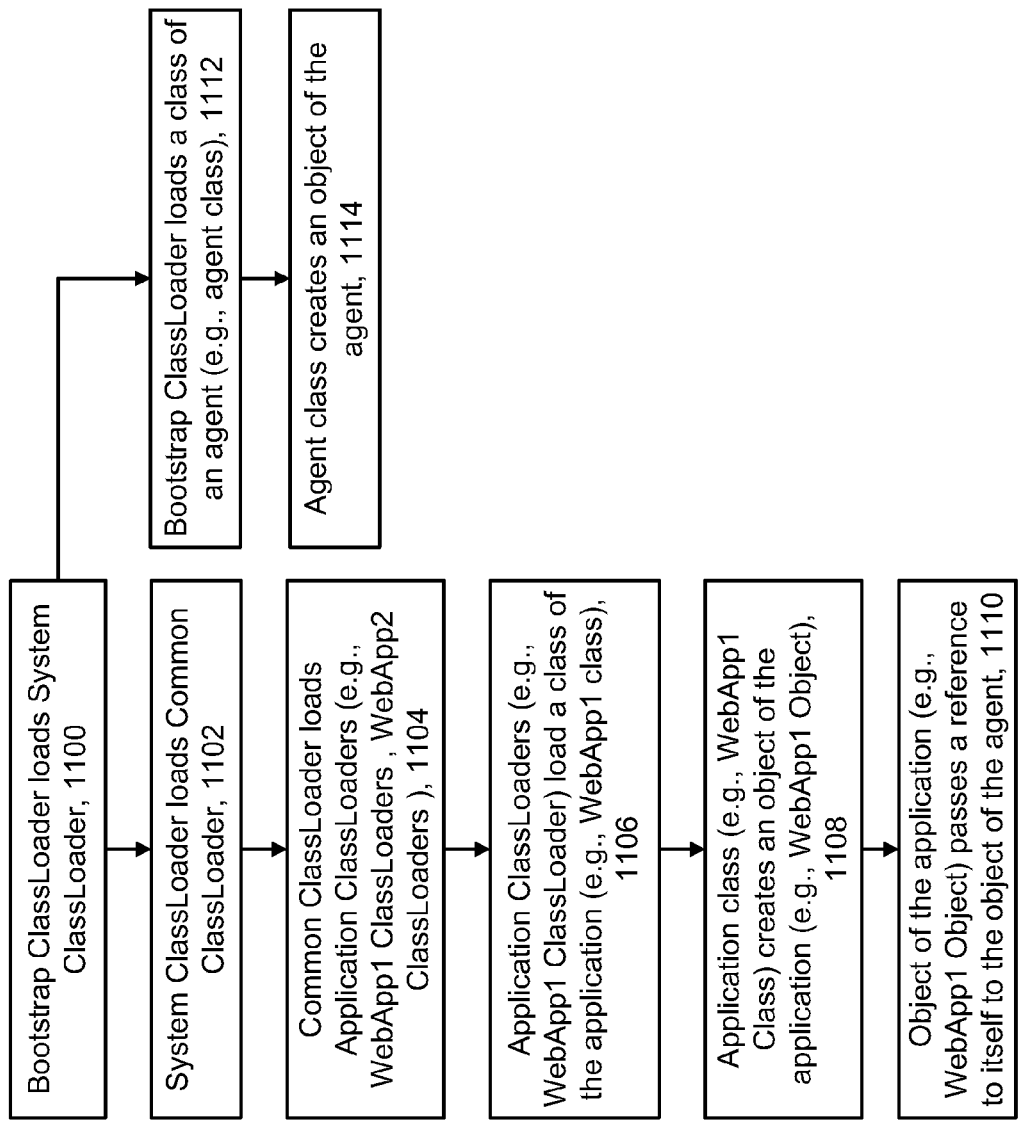

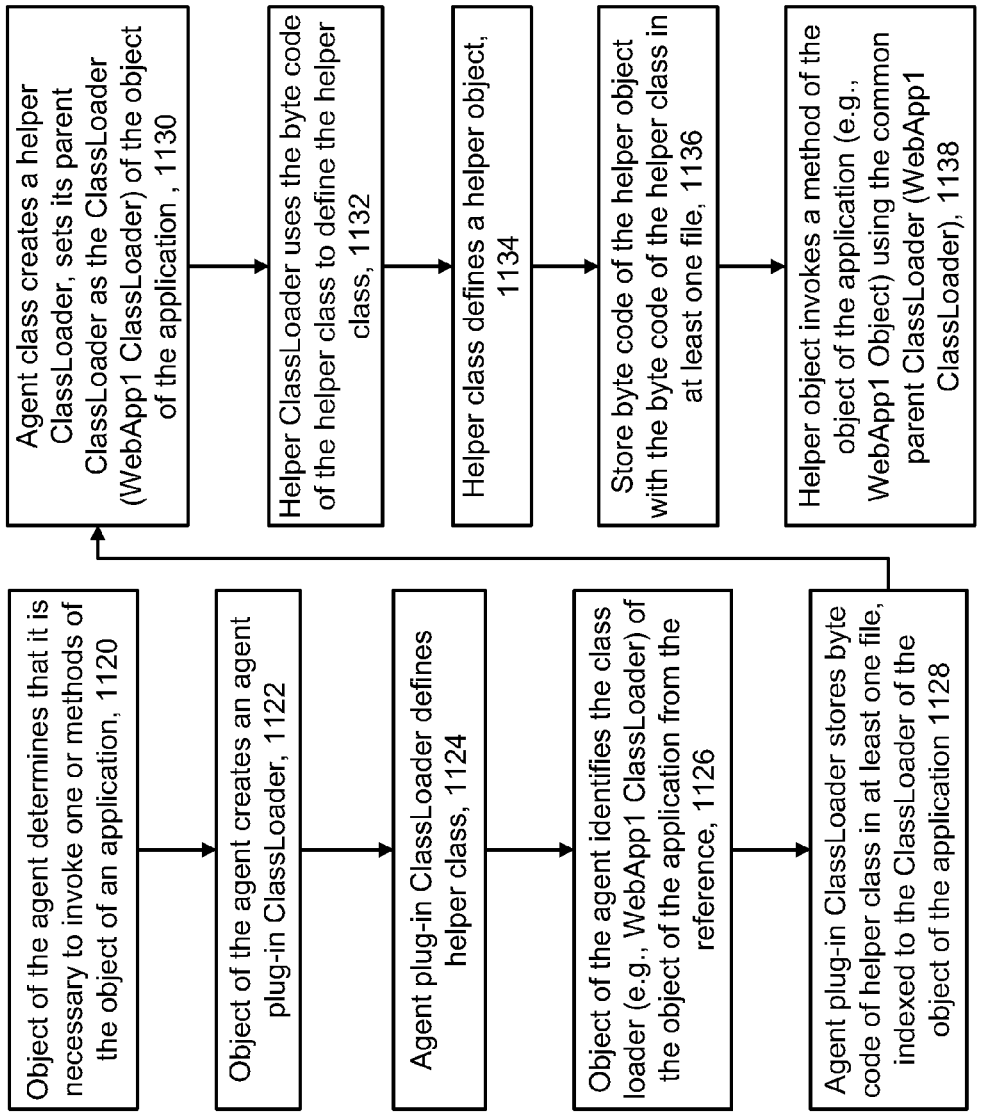

Fig. 12A

```
package com.wily.introscope.agent.trace.servlet;
import java.io.IOException;
import java.util.HashMap;
import java.util.Map;

import com.wily.introscope.agent.util.ByteClassUtil;
import com.wily.util.feedback.IModuleFeedbackChannel;

public class BytecodeClassLoader extends ClassLoader{
    // contains the bytecode of the loaded class from the external jar
    private final Map repository = new HashMap();

public BytecodeClassLoader(ClassLoader parent, ClassLoader classClassLoader, String[] classNames,
IModuleFeedbackChannel feedback ){
        super(parent);
        for(int i = 0; i < classNames.length; i++){
            // get the bytes for the classes from their classloader and jar
            try {
                byte[] code = ByteClassUtil.getBytesForClass(classClassLoader,classNames[i], Integer.MAX_VALUE,
feedback);
                repository.put(classNames[i], code);
            } catch (IOException e) {
                e.printStackTrace();
            }
        }
    }

// Override the find class to use the bytecode loaded from the jar
    protected Class findClass(String name)
throws ClassNotFoundException{
        if(repository.containsKey(name)){
            byte[] code = (byte[]) repository.get(name);
            return defineClass(name, code, 0, code.length);
        }
        return super.findClass(name);
    }
}
```

Fig. 12B

```java
static volatile String[] helperClasses;

static volatile BytecodeClassLoader helperForSystemLoader;

/**
 * Will return a correct classloader to get any helper, and the classloader
 * is going to be created based on the classloader of the monitored object
 *
 * @param loader the classloader of the loaded object
 * @param feedback the agent feedback channel
 */
public static BytecodeClassLoader getServletHelper(ClassLoader loader,
        IModuleFeedbackChannel feedback) {
    boolean useSystemLoader = (loader == null);
    BytecodeClassLoader result = null;
    if (useSystemLoader) {
        result = helperForSystemLoader;
    } else {
        result = repository.get(loader);
    }
    if (result == null) {
        BytecodeClassLoader helper = null;
        try {
            helper = new BytecodeClassLoader(
                    (useSystemLoader) ? ClassLoader.getSystemClassLoader()
                            : loader, helperClassLoader, helperClasses,
                    feedback);
        } catch (Throwable t) {
            t.printStackTrace();
        }
        if (helper != null) {
            result = (BytecodeClassLoader) helper;
        }
        if (useSystemLoader) {
            helperForSystemLoader = result;
        } else {
```

Fig. 12C

```
// Put in the cache is absent.  Note: there may be more than one put here, but at most there are as many puts
// as concurrent threads doing this.
            BytecodeClassLoader existingHelper = repository.put(loader,
                    result);
            if (existingHelper != null) {
                    result = existingHelper;
            }
    }
    return result;
} public static void setHelperClass(Class<?> class1) {
    helperClassLoader = class1.getClassLoader();
} public static void setHelperClasses(String[] class1) {
    helperClasses = class1;
} public static void resetRepository() {
    // does not need to be synchronized, it is a concurrent map
    repository.clear();
} public int IAgentService_getServiceVersion() {
    return 2;
} public void IAgentService_startService(IAgent agent, @SuppressWarnings("rawtypes") Map parameters)
        throws Exception {
    setHelperClass(WilyOutputStreamSubstituter.class);
    // TODO: externalize this!
    setHelperClasses(new String[] {
            "com.wily.introscope.agent.servlet.WilyServletInputStream",
            "com.wily.introscope.agent.servlet.WilyServletOutputStream",
            "com.wily.introscope.agent.servlet.WilyResponse",
            "com.wily.introscope.agent.servlet.WilyRequest" });
}
```

CLASSLOADER/INSTRUMENTATION APPROACH FOR INVOKING NON-BOUND LIBRARIES

BACKGROUND OF THE INVENTION

1. Field of the Invention

Technology for monitoring software in a computing environment is provided.

2. Description of the Related Art

The growing presence of the Internet as well as other computer networks such as intranets and extranets has brought many new applications in e-commerce, education and other areas. Organizations increasingly rely on such applications to carry out their business or other objectives, and devote considerable resources to ensuring that they perform as expected. To this end, various application management techniques have been developed. One approach involves monitoring the infrastructure of the application by instrumenting the application and using the instrumentation to collect data regarding the individual software components that are invoked in the application. This approach can use agents that essentially live in the system being monitored. For example, using the instrumentation, a thread or process can be traced to identify each component that is invoked, as well as to obtain runtime data such as the execution time of each component. However, the agent's ability to otherwise interact with the application components has been limited.

SUMMARY OF THE INVENTION

The present invention provides a technique which allows agent software to access an application such as to invoke methods of the application in an efficient manner.

In one embodiment, one or more tangible processor-readable storage devices having computer readable software embodied thereon are provided for programming at least one processor to perform a method for accessing an application. The method includes: (a) at an agent, receiving a reference to an object of the application from instrumentation of the application, and identifying a class loader of the application from the reference, and (b) based on the reference, performing a process which allows the agent to invoke one or more methods of the application object. The process comprises: (i) at the agent, identifying the class loader of the application from the reference; (ii) creating a helper class loader and setting a parent class loader of the helper class loader as the class loader of the application, responsive to the identifying; (iii) using the helper class loader to obtain and load byte code of a helper class; (iv) using the loaded byte code of the helper class to define a helper object; and (v) using the helper object, invoking the one or more methods of the application object.

In another embodiment, one or more tangible processor-readable storage devices having computer readable software embodied thereon are provided for programming at least one processor to perform a method for accessing an application. The method includes: (a) at an agent, receiving a reference to an object of the application from instrumentation of the application, and identifying a class loader of the application from the reference; and (b) based on the reference, performing a process which allows the agent to invoke one or more methods of the application object. The process comprises: (i) at the agent, identifying the class loader of the application from the reference; (ii) creating a helper class loader and setting a parent class loader of the helper class loader as the class loader of the application, responsive to the identifying; (iii) using the helper class loader to obtain and load byte code of a helper class and a helper object from at least one file; and (iv) using the helper object, invoking the one or more methods of the application object.

In another embodiment, a computer-implemented method for accessing an application includes: (a) at an agent, receiving a reference to an object of an application from instrumentation of the application, and identifying a class loader of the application from the reference; (b) creating a helper class loader and setting a parent class loader of the helper class loader as the class loader of the application, responsive to the identifying; (c) using the helper class loader to obtain and load byte code of a helper class; (d) using the loaded byte code of the helper class to define a helper object; and (e) using the helper object, invoking the one or more methods of the application object.

Corresponding processor-implemented methods may be provided which perform computer-implemented steps as described herein. A corresponding computer system may be provided which includes one or more tangible processor-readable storage devices having computer readable software embodied thereon, and at least one processor, where the at least one processor is responsive to the one or more tangible processor-readable storage devices to perform a method for accessing an application, as described herein.

One or more tangible processor-readable storage devices having computer readable software embodied thereon can also be provided for programming at least one processor to perform the above-mentioned method. A corresponding computer system may be provided which includes one or more tangible processor-readable storage devices having computer readable software embodied thereon, and at least one processor, where the at least one processor is responsive to the one or more tangible processor-readable storage devices to perform a method for accessing an application, as described herein.

BRIEF DESCRIPTION OF THE DRAWINGS

FIG. 1 depicts an example system in which multiple instances of an application run on different servers, and agents of the servers report to a manager.

FIG. 4 depicts a hierarchy for use in describing the operation of one or more applications.

FIG. 7 depicts a JAVA runtime environment as one example execution environment of an application of FIG. 1.

FIG. 9 depicts a user interface display which indicates a hierarchical relationship among components, and corresponding performance data.

FIG. 11A depicts a process corresponding to FIG. 10 in which an application and an agent have a common Bootstrap ClassLoader.

FIG. 11B depicts a process corresponding to FIG. 10 in which an agent creates and uses a helper object to access a method of an application.

FIGS. 12A-12C A provide JAVA code of a specific implementation of a helper.

DETAILED DESCRIPTION

The present invention provides a technique which enables agent software to efficiently invoke a method of an application. When agent software is used to instrument the bytecode of an application, an arbitrary object of the application is re-defined to invoke a method in an agent shim object, passing itself as a parameter, in one possible approach. The agent software performs several operations, some of which require access to specific fields and methods on the application object or other objects passed as parameters to the original application method. For example, if an instrumented method is a servlet.service method, the agent will attempt to invoke methods on the parameter object implementing HttpServletRequest.

In one approach, the agent uses the JAVA Reflection Application Programming Interface (API) to invoke the methods, instead of the more direct technique of class casting. Non-bound libraries are not linked statically and therefore need to be read using the Reflection approach instead of casting. Reflection is a feature in the JAVA programming language which allows an executing JAVA program to examine or "introspect" upon itself, and manipulate internal properties of the program. For example, it's possible for a Java class to obtain the names of all its members and display them. The Reflection API is used by programs to examine or modify the runtime behavior of applications running in the JAVA virtual machine (JVM). The agent can use the Reflection API when the agent does not have access through its class loader to the same API classes that are used by the application object. An example of class loader is the abstract JAVA class of ClassLoader.

However, the Reflection API is a weak-typed API or method call because it works at the JVM level rather than the compiler level, so the type of the object that is invoked is not known at compile time. Although, JAVA generally is a strong-typed language since the type of all object invocations is known or can be inferred at compile time. As a result, invocation of methods using the Reflection API can be slow and inefficient. Techniques described herein allow an agent to invoke a method of an application using casting, which is strong-typed and therefore fast and inefficient, instead of using the Reflection API.

Figure 10:
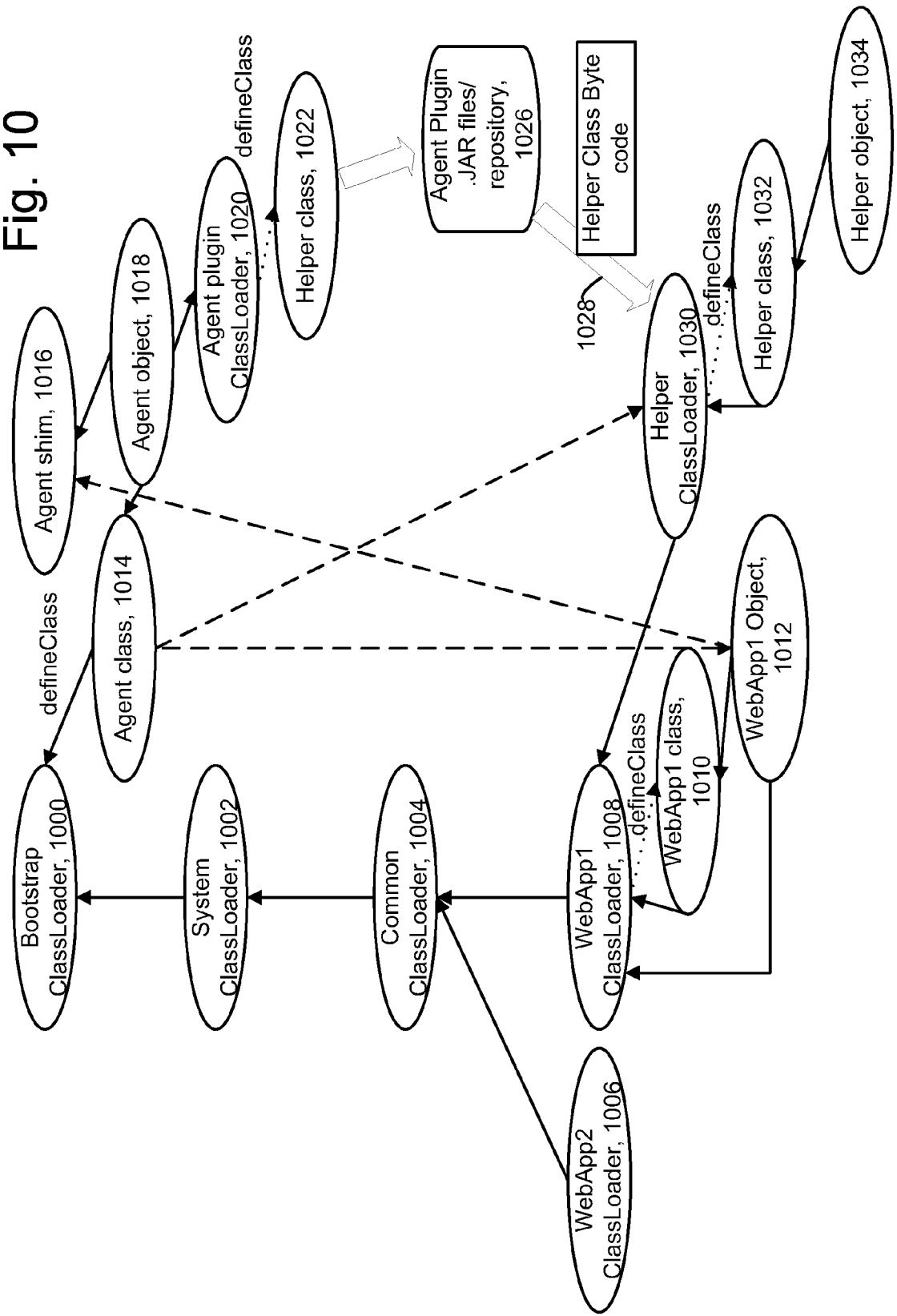
FIG. 10 depicts relationships among different software components in a computing system in which an agent creates a helper object to access a method of an application.
Figure 11C:
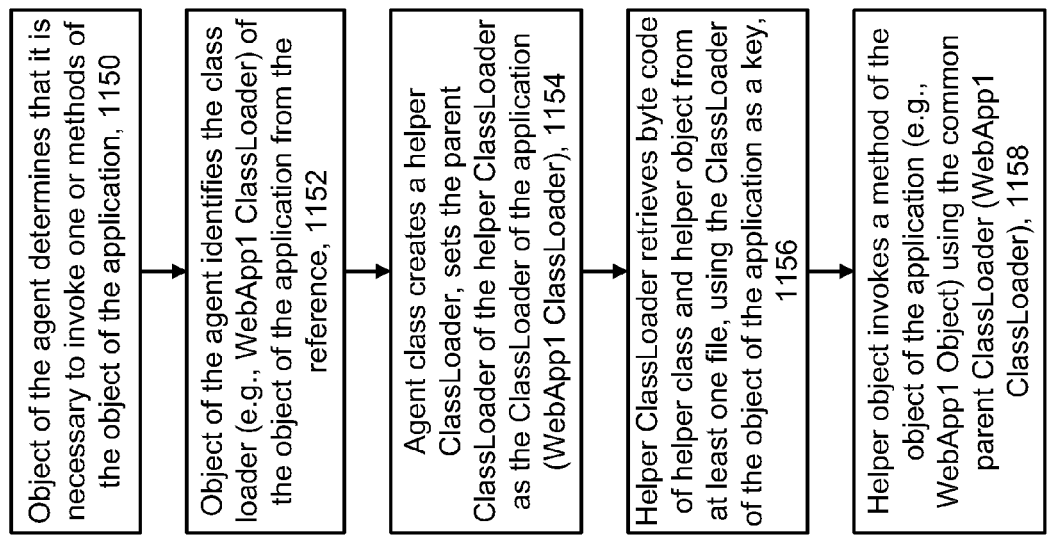
FIG. 11C depicts a process corresponding to FIG. 10 in which an agent uses a previously-created helper object to access a method of an application.

FIGS. 1-9 provide a background discussion of a context in which agent software can invoke a method of an application, and FIGS. 10-11C provide a specific discussion of how agent software can invoke a method of an application.

FIG. 1 depicts an example system 100 in which multiple instances of an application run on different servers, and agents of the servers report to a manager. Example managed computing devices 103 and 105 may include application servers or any other type of computing device having one or more processors for executing code to achieve a desired functionality. The managed computing devices can be located remotely from one another or co-located. The managed computing devices communicate with a manager computer 111 via a network 102. The network 102 can include, e.g., the Internet, one or more wide area networks, and/or one or more local area networks. The manager computer 111 can be local to, or remote from, the managed computing devices. The managed computing devices 103 and 105 also communicate with client computing devices such as an example web browser 101 via the network 102. The web browser 101 may access the network 102 via an Internet Service Provider, for instance. The managed computing devices can also call a backend system 108 such as a mainframe, database or some other uninstrumented computing device, to obtain information which is needed to respond to a request from the web browser. This call can use a Web Services call or Enterprise Java Bean (EJB) Client, for instance. The managed computing devices are considered to be front end subsystems from which a full range of performance metrics can be obtained. In contrast, limited information may be obtained regarding an uninstrumented subsystem such as the backend subsystem 108.

For example, a corporation running an enterprise application such as a web-based e-commerce application may employ a number of application servers at one location for load balancing. Requests from users, such as from the example web browser 101, are received via the network 102, and can be routed to any of the managed computing devices. Agent software running on the managed computing devices 103 and 105, denoted by agent 104 and agent 106, respectively, gather information from an application, middleware or other software, running on the respective managed computing devices. Such information may be obtained using instrumentation, one example of which is byte code instrumentation. However, the gathered data may be obtained in other ways as well. The agents essentially live in the computing device being monitored and provide a data acquisition point. The agents organize and optimize the data communicated to the manager 111. In one implementation, different instances of the same application run at the managed computing devices.

The manager 111 can be provided on a separate computing device such as a workstation which communicates with a user interface 113 (see also FIG. 9), such as a monitor, to display information based on data received from the agents. The manager can also access a database 112 to store the data received from the agents. For instance, some large organizations employ a central network operations center where one or more managers obtain data from a number of distributed agents at different geographic locations. To illustrate, a web-based e-commerce enterprise might obtain agent data from servers at different geographic locations that receive customer orders, from servers that process payments, from servers at warehouses for tracking inventory and conveying orders, and so forth. The manager 111 and user interface display 113 might be provided at a corporate headquarters location. Other applications which are not necessarily web-based or involve retail or other sales, similarly employ agents and managers for managing their systems. For example, a bank may use an application for processing checks and credit accounts. Moreover, in addition to the multi-computing device arrangements mentioned, a single computing device can be monitored as well with one or more agents.

Various approaches are known for instrumenting software to monitor its execution. For example, tracing may be used to track the execution of software. One example of tracing is discussed in U.S. Pat. No. 7,870,431, issued Jan. 11, 2011, titled "Transaction Tracer," and incorporated herein by reference. In one approach discussed therein, object code or bytecode of an application to be monitored is instrumented, e.g., modified, with probes. The probes measure specific pieces of information about the application without changing the application's business or other logic. Once the probes have been installed in the bytecode of an application, it is referred to as a managed application, and a computing device on which the application runs is referred to as a managed computing device. The agent software receives information from the probes and may communicate the information to another process, such as at the manager 111, or process the information locally, such as to determine whether the information indicates an abnormal condition. The agent thus collects and summarizes information received from the probes. The probes collect information as defined by a directives file. For example, the information from the probes may indicate start and stop times of a transaction or other execution flow, or of individual components within a transaction/execution flow. This information can be compared to pre-established criteria to determine if it within bounds. If the information is not within bounds, the agent can report this fact to the manager so that appropriate troubleshooting can be performed. The agents are typically aware of the software executing on the local managed computing device with which they are associated.

The probes can report a standard set of metrics which include: CORBA method timers, Remote Method Invocation (RMI) method timers, Thread counters, Network bandwidth, JDBC update and query timers, Servlet timers, Java Server Pages (JSP) timers, System logs, File system input and output bandwidth meters, Available and used memory and EJB (Enterprise JavaBean) timers. A metric is a measurement of a specific application activity. Each of these metrics can be configured by agent metadata.

An agent reports information about transactions, which identifies resources which are accessed by an application. In one approach, when reporting about transactions, the word Called designates a resource. This resource is a resource (or a sub-resource) of a parent component, which is a consumer. For example, assume that Servlet A is the first component invoked in a transaction. Under the consumer Servlet A (see below), there may be a sub-resource Called EJB. Consumers and resources can be reported by the agent in a tree-like manner. Data for a transaction can also be stored according to the tree. For example, if a Servlet (e.g., Servlet A) is a consumer of a network socket (e.g., Socket C) and is also a consumer of an EJB (e.g. EJB B), which in turn is a consumer of a JDBC (e.g., JDBC D), the tree might look something like the following:

```
Servlet A
    Data for Servlet A
    Called EJB B
        Data for EJB B
        Called JDBC D
            Data for JDBC D
    Called Socket C
        Data for Socket C
```

In one embodiment, the above tree is stored by the agent in a stack, called the Blame Stack. When transactions are started, they are pushed onto the stack. When transactions are completed, they are popped off the stack. In one embodiment, each transaction on the stack has the following information stored: type of transaction, a name used by the system for that transaction, a hash map or dictionary of parameters, a timestamp for when the transaction was pushed onto the stack, and sub-elements. Sub-elements are Blame Stack entries for other components (e.g., methods, process, procedure, function, thread, set of instructions, etc.) that are started from within the transaction of interest. Using the tree as an example above, the Blame Stack entry for Servlet A would have two sub-elements. The first sub-element would be an entry for EJB B and the second sub-element would be an entry for Socket Space C. Even though a sub-element is part of an entry for a particular transaction, the sub-element will also have its own Blame Stack entry. An example of an entry point to a transaction/branch is a URL. As the tree above notes, EJB B is a sub-element of Servlet A and also has its own entry. The top (or initial) entry (e.g., Servlet A) for a transaction, is called the root component. Each of the entries on the stack is an object.

Each agent adds instrumentation to an application and is configured based on one or more configuration files. For example, agent 104 may use configuration files 115, 117 and 119, and agent 106 may use configuration files 121, 123 and 125. The configuration files can include an agent profile file, a probe builder directives file and a probe builder list file, for instance (e.g., files 115, 117 and 119, respectively, or 121, 123 and 125, respectively). One or more of each type of file may be used.

The agent profile files are responsible for enabling/disabling of agent features, location of server, type of communication (e.g., plain socket, SSL, HTTP, HTTP over SSL), location of configuration files and log files, metric sending frequency, and so forth.

A probe builder directives file contains directives for the agent. Directives may contain information about the type and source of metrics to generate, e.g., by specifying at least one method of a class or set of classes to monitor and a type of information to be collected in the application, or information about a formatter for renaming a metric, and so forth. Directives can also specify at least one method of a class or set of classes to instrument.

A PBL (Probe Builder Listing) configuration file is used for grouping a set of PBD files.

The applications of the servers 103 and 106 can execute in an execution environment such as the JAVA runtime environment, as discussed in connection with FIG. 7. The JAVA runtime environment uses a Java Virtual Machine (JVM). Programs intended to run on a JVM are typically compiled into a standardized portable binary format, which usually are in the form of .class files. A program may include many classes in different files. For easier distribution of large programs, multiple class files may be packaged together in a (JAVA Archive) JAR file. The JVM runtime executes CLASS or JAR files, emulating the JVM instruction set by interpreting it, or using a just-in-time compiler (JIT). JIT compiling, as opposed to interpreting, is often used in a JVM to achieve greater speed.

Figure 2B:
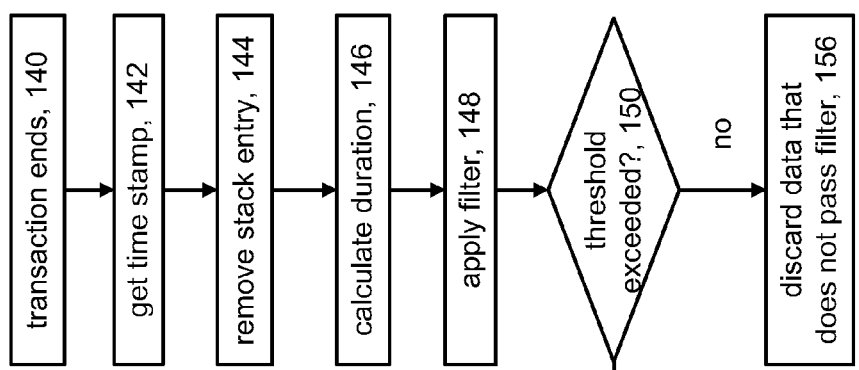
FIG. 2B is a flowchart describing one embodiment of a process for concluding the tracing of a transaction.
Figure 2A:
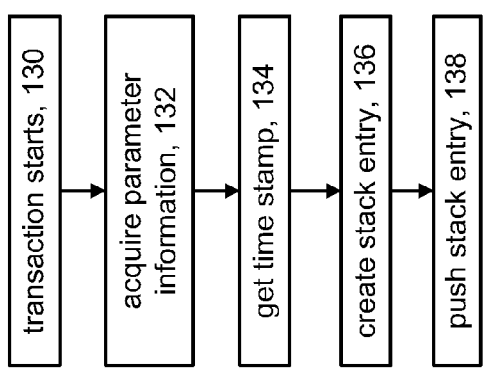
FIG. 2A is a flowchart describing one embodiment of a process for starting the tracing of a transaction.

FIG. 2A is a flowchart describing one embodiment of a process for starting the tracing of a transaction. The steps are performed by the appropriate agent(s). In step 130, a transaction starts. In one embodiment, a transaction starts a class-method pair in the application. The instrumented code in that method calls a method (e.g., "loadTracer") of the Agent. In step 132, the agent acquires the desired parameter information. In one embodiment, a user can configure which parameter information is to be acquired via a configuration file or a UI. The acquired parameters are stored in a hash map or dictionary, which is part of the object pushed onto the Blame Stack. In other embodiments, the identification of parameters is pre-configured. There are many different parameters that can be stored. In one embodiment, the actual list of parameters used is dependent on the application being monitored. The table below provides examples of some parameters that can be acquired.

| Parameters | Appears in | Value |
|---|---|---|
| UserID | Servlet, JSP | The UserID of the end-user invoking the http servlet request. |
| URL | Servlet, JSP | The URL passed through to the servlet or JSP, not including the Query String. |
| URL Query | Servlet, JSP | The portion of the URL that specifies query parameters in the http request (text that follows the '?' delimiter). |
| Dynamic SQL | Dynamic JDBC Statements | The dynamic SQL statement, either in a generalized form or with all the specific parameters from the current invocation. |
| Method | Blamed Method timers (everything but Servlets, JSP's and JDBC Statements) | The name of the traced method. If the traced method directly calls another method within the same component, only the "outermost" first encountered method is captured. |
| Callable SQL | Callable JDBC statements | The callable SQL statement, either in a generalized form or with all the specific parameters from the current invocation. |
| Prepared SQL | Prepared JDBC statements | The prepared SQL statement, either in a generalized form or with all the specific parameters from the current invocation. |
| Object | All non-static methods | toString( ) of the this object of the traced component, truncated to some upper limit of characters. |
| Class Name | All | Fully qualified name of the class of the traced component. |
| Param_n | All objects with WithParams custom tracers | toString( ) of the nth parameter passed to the traced method of the component. |
| Primary Key | Entity Beans | toString( ) of the entity bean's property key, truncated to some upper limit of characters. |

Parameters can include query, cookie, post, URL and session type name/value pairs.

In step 134, the system acquires a timestamp indicating the current time. In step 136, a stack entry is created. In step 138, the stack entry is pushed onto the Blame Stack. In one embodiment, the timestamp is added as part of step 138. The process is performed when a transaction is started. A similar process is performed when a sub-component of the transaction starts (e.g., EJB B is a sub-component of Servlet A—see tree described above).

FIG. 2B is a flowchart describing one embodiment of a process for concluding the tracing of a transaction. The process is performed by an agent when a transaction ends. In step 140, the process is triggered by a transaction (e.g., method) ending (e.g., calling of a method in the agent such as "finishTrace"). In step 142, the system acquires the current time. In step 144, the stack entry is removed. In step 146, the execution time of the transaction is calculated by comparing the timestamp from step 142 to the timestamp stored in the stack entry. In step 148, the filter for the trace is applied. For example, the filter may include a threshold period of one second. Thus, step 148, would include determining whether the calculated duration from step 146 is greater than one second. If the threshold is not exceeded (step 150), then the data for the transaction is discarded. In one embodiment, the entire stack entry is discarded. In another embodiment, only the parameters and timestamps are discarded. In other embodiments, various subsets of data can be discarded. In some embodiments, if the threshold period is not exceeded then the data is not transmitted by the agent to other components in the system of FIG. 1. If the duration exceeds the threshold (step 150), then the agent builds component data in step 160. Component data is the data about a transaction that will be reported. In one embodiment, the component data includes the name of the transaction, the type of the transaction, the start time of the transaction, the duration of the transaction, a hash map or dictionary of the parameters, and all of the sub-elements (which can be a recursive list of elements). Other information can also be part of the component data. In step 162, the agent reports the component data by sending the component data via the TCP/IP protocol to the manager 111.

FIG. 2B represents what happens when a transaction finishes. When a sub-component finishes, however, the steps performed include getting a time stamp, removing the stack entry for the sub-component and adding the completed sub-element to previous stack entry. In one embodiment, the filters and decision logic are applied to the start and end of the transaction, rather than to a specific sub-component.

Note, in one embodiment, if the transaction tracer is off, the system will still use the Blame Stack; however, parameters will not be stored and no component data will be created. In some embodiments, the system defaults to starting with the tracing technology off. The tracing only starts after a user requests it, as described above.

Figure 3:
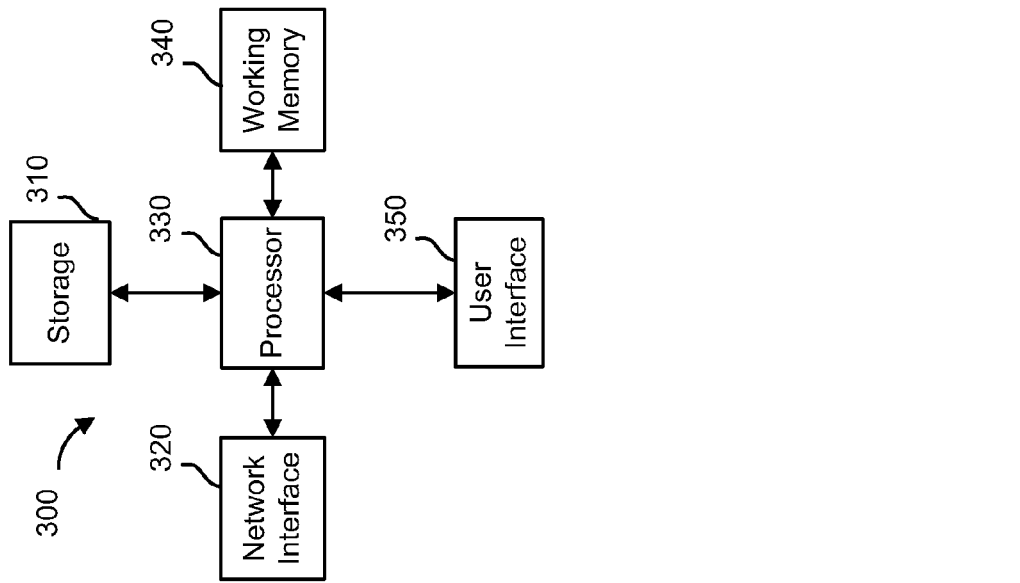
FIG. 3 depicts a computing device of the network of FIG. 1.

FIG. 3 depicts a computing device of the network of FIG. 1. The computing device 300 is a simplified representation of a system which might be used as one of the web browsers, application server, managers, databases, backend subsystems and/or user interfaces, such as discussed in connection with FIG. 1. The computing device 300 includes a storage device 310 such as a hard disk or portable media, a network interface 320 for communicating with other computing devices, a processor 330 for executing software instructions, a working memory 340 such as RAM for storing the software instructions after they are loaded from the storage device 310, for instance, and a user interface display 350 such as one or more video monitors. A user interface can be provided one or more monitors. The storage device 310 may be considered to be a tangible, non-transitory processor- or computer-readable storage device having processor readable code embodied thereon for programming the processor 330 to perform methods for providing the functionality discussed herein. The user interface display 350 can provide information to a human operator based on the data received from one or more agents. The user interface display 350 can use any known display scheme, whether graphical, tabular or the like (see FIG. 9). In addition to an on-screen display, an output such as a hard copy such from a printer can be provided.

A database may be included in the storage device 310 when the storage device 310 is part of a computing device 300 such as an application server, manager and/or user interfaces. The storage device 310 can represent one or more storage devices which store data received from one or more agents, and which can be accessed to obtain data to provide a user interface as described herein. The storage device 310 can represent a data store.

Further, the functionality described herein may be implemented using hardware, software or a combination of both hardware and software. For software, one or more non-transitory, tangible processor readable storage devices having processor readable code embodied thereon for programming one or more processors may be used. The non-transitory, tangible processor readable storage devices can include computer readable media such as volatile and nonvolatile media, removable and non-removable media. For example, non-transitory, tangible computer readable media may include volatile and nonvolatile, removable and non-removable media implemented in any method or technology for storage of information such as computer readable instructions, data structures, program modules or other data. Examples of non-transitory, tangible computer readable media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more tangible computer readable media/storage devices, peripherals and/or communication interfaces.

FIG. 4 depicts a hierarchy for use in describing the operation of one or more applications. The different levels of the hierarchy can be defined based on any desired organizational structure. For example, the hierarchy can include human-facing terminology, that is, terminology which facilitates understanding of client's interactions with a monitored application. A hierarchy may encompass any type of interaction with an application, whether the interaction is in the realm of a for-profit business, such as for e-commerce transactions, educational organization or government organization, for instance. Further, the one or more hierarchies can include nodes at different levels of the one or more hierarchies, where each node has a descriptive name. The hierarchy can be considered to be an abstract construct which provides a way to organize information about how an application executes in a manner which is more understandable to the human operator.

A top level of the hierarchy is a domain level 400 named "Domain." A next level of the hierarchy is a Business Service level 402. An example of a Business Service relates to trading a stock using a web site. Thus, "Trading" can be the name of a node at the Business Service level of the hierarchy. A next level of the hierarchy is a Business Transaction level. A Business Service can be made up of a number of Business Transactions. For example, for Trading, the Business Transactions can include Reports 404 (e.g., view a report regarding a stock or an account) and Quotes 406 (e.g., obtain a quote for a stock price). Further, a Business Transaction can be associated with one or more Business Transaction Components. In one approach, a Business Transaction has only one identifying component. A Business Transaction Component can be a type of component of an application which is recognizable and measurable by a server, such as a servlet or EJB. In one approach, one of the components of an application is set as a Business Transaction Component, which is an identifying transaction component for a Business Transaction.

The Business Transaction Component is the identifying transaction component for the transaction that is the identifying transaction for the Business Transaction. A transaction can represent a sequence of software components which are invoked in response to a request from a client, to provide a corresponding response to the client. For example, a Business Transaction Component can be identified by determining when component data reported by an agent match a set of rules. This definition can include, e.g., a specified URL host name, URL parameters, HTTP post parameters, cookie and/or session manager parameters. Additionally, or alternatively, the definition may require a transaction to start with a specified URL host name. The agent or manager, for instance, can compare the component data against the set of rules to determine when a Business Transaction Component is present in a Business Transaction. If a Business Transaction Component is detected, then the associated Business Transaction is of a specified type. For example, if the Business Transaction Component 408 is detected, then the associated Business Transaction is Reports 404. If the Business Transaction Component 410 is detected, then the associated Business Transaction is Quotes 406.

Figure 5:
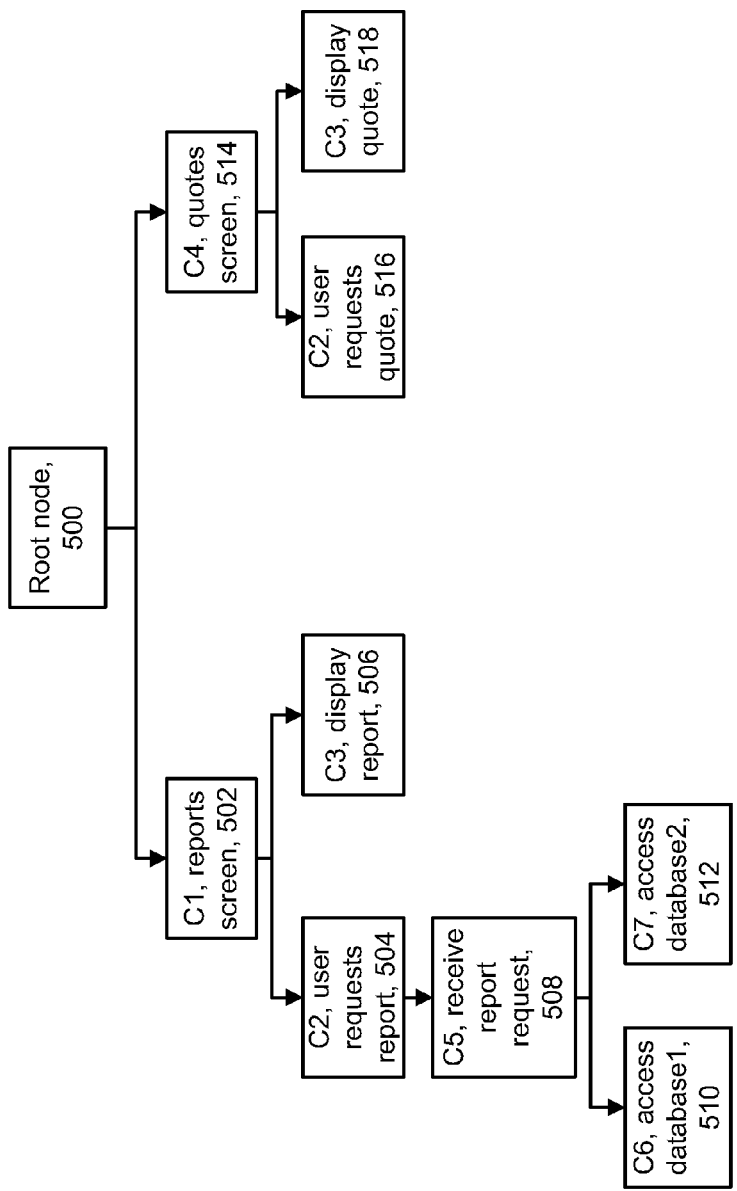
FIG. 5 depicts dependency relationships in an example sequence of components invoked in the Reports and Quotes Business Transactions of FIG. 4.

FIG. 5 depicts dependency relationships in an example sequence of components invoked in the Reports and Quotes Business Transactions of FIG. 4. The components are depicted as blocks in a flow path. The same component can appear more than once.

Component-oriented programming models are useful in allowing the programmer to assemble an application or other program from building blocks referred to as components. Each component can perform a specific function which fits in with an overall functionality of the software. Furthermore, a component can call other components, as well as calling itself, in a recursive call, so that a sequence of components is invoked in a program. One example of a component oriented programming model is J2EE, which can employ components such as a Java Server Page, an EJB, a servlet, and a Java Database Connectivity (JDBC) component. JDBC is an Application Programming Interface (API) for the JAVA™ programming language that defines how a client may access a database. It provides methods for querying and updating data in a database. However, other component oriented programming models such as the MICROSOFT CORP. ".NET" Framework may also be used. Moreover, the programming model need not be object oriented.

This example provides details of the Reports and Quotes Business Transactions discussed previously. In one possible implementation, each component of a Business Transaction includes one or more class-method pairs. For example, a servlet is a JAVA class. It is an object that receives a request and generates a corresponding response. A class-method pair can be represented by the notation class.method. For example, Reports could include a component C1 (502) which displays a reports screen on a user interface (UI) to receive a user's input regarding a desired report. An example format of a class-method pair for C1 is ServletA1.DisplayReportScreen. C1 is under a root 500. Thus, whenever an agent detects that C1 has been invoked, it concludes that the current transaction is part of Reports, and associates its component data with Reports.

C1 can call C2 (504) which relates to a requested report. C2 could include a class-method pair such as ServletA2.RequestedReport which processes a user input of a requested report. This processing could include checking the format of the request, for instance, and, if the format is valid, making a call to a component C5 (508), which receives the report request. For instance, this call may be a cross-process, cross-thread transaction or cross-subsystem call. If the format is invalid, the control flow returns to C1, which may call C3 to display an error message, for instance.

An example format of a class-method pair for C5 is ServletA3.ReceiveReportRequest. C5 can call C6 (510) to access a database1 and/or C7 (512) to access a database2, such as based on the type of the report request. For example, C6 and C7 can each include a JDBC driver call which invokes one or more SQL statements. The control flow then returns to C5, then to C2 and then to C1. Subsequently, C1 calls C3 (506) which relates to providing a display, such as a display of the requested report based on data retrieved from the databases. The control flow then returns to C1.

Also, under the root 500, a component C4 (514) can be provided which displays a quotes screen on a user interface (UI) to receive a user's input regarding a desired quote. C1 can call C2 (504) which relates to a requested report. C2 can process the user input by checking the format of the request, for instance, and if the format is valid, obtaining the requested quote, such as from a data source which is local to sub-system1. If the format is invalid, the control flow returns to C4, which may call C3 to display an error message, for instance. The control flow then returns to C4. C4 can call C3 (518), which relates to providing a display, such as a display of the requested quote based on the data retrieved from the data source.

Note that a component can continue executing after calling another component, which begins executing, in an asynchronous, multi-thread or multi-process mode. Or, a component can temporarily pause until the called component has finished executing, in a synchronous, single-thread or single-process mode. A component which is pausing can be considered to be in a wait interval, while a component which is executing can be considered to be in an active, executing mode. Also, a component may be invoked more than once during a transaction.

Figure 6:
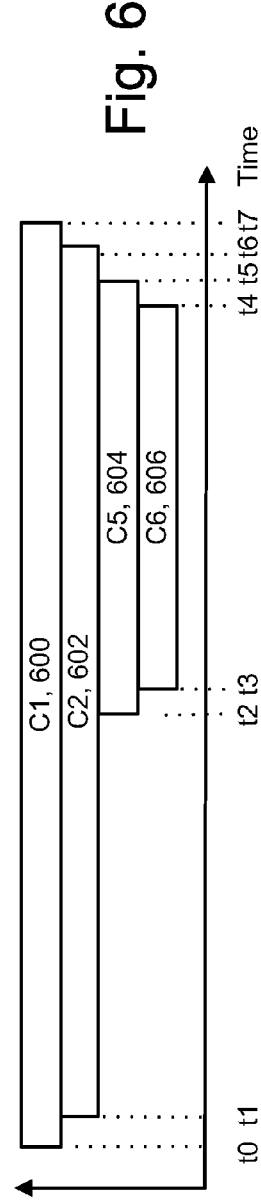
FIG. 6 depicts a transaction trace for a sequence of invoked components in the transactions of FIG. 5.

FIG. 6 depicts a transaction trace for a sequence of invoked components in the transactions of FIG. 5. The horizontal direction represents time, while the vertical direction indicates call stack depth or position. A transaction trace, also referred to as a call stack, identifies instrumented components which have been called or invoked during the execution of one or more programs, processes or threads. Trace data of instrumented components can be used along with dependency data to understand and debug an application. A transaction trace can be a trace of all or a portion of a transaction and can extend over one or more computing devices having respective agents. In particular, a separate transaction trace can be provided for each agent, such that different threads are separated out into different transaction traces. The transaction trace can be provided by a graphical representation on a user interface display, such as in FIG. 9.

The transaction trace of FIG. 6 involves components C1, C2, C5 and C6, represented by graph portions 600, 602, 604 and 606, respectively. C1 starts executing at t0 and ends or stops at t7. C2, which is called by C1, starts executing at t1 and ends at t6. C5, which is called by C2, starts executing at t2 and ends at t5. C6, which is called by C5, starts executing at t2 and ends at t4. The time increments are not necessarily equidistant.

FIG. 7 depicts a JAVA runtime environment as one example execution environment of an application of FIG. 1. The JAVA runtime environment 700 is built on an operating system, 720, which is built on hardware 730. The JAVA runtime environment includes a number of virtual parts, including the JAVA API Class 702 and a JVM 704. The JVM includes registers 706, an operand stack 708, a heap 710 and a method area 712. The JVM processes a stream of byte codes as a sequence of instructions. A JVM instruction consists of an opcode specifying the operation to be performed, followed by zero or more operands embodying values to be operated upon. The operand stack 708, heap 710 and method area 712 are within addressable memory. The size of an address is 32 bits, each memory location contains one byte, and each register stores one 32-bit address. The method area contains byte codes and is aligned on byte boundaries, while the operand stack and the heap are aligned on word (32-bit) boundaries.

The registers include a program counter (pc), which keeps track of where in the memory it should be executing instructions. The program counter identifies the next byte code to be executed. The frame register contains a pointer to the execution environment of the current method in the operand stack. The operand top (optop) register contains a pointer to the top of the operand stack, and is used to evaluate arithmetic expressions. The variable (vars) register contains a pointer to local variables.

The operand stack supplies parameters to methods and operations and receives results back from them. All byte code instructions take operands from the stack, operate on them, and return results to the stack. The operand stack includes a stack frame of an executing method. The stack frame holds the state, e.g., local variables, and intermediate results of calculations, for a particular invocation of a method. Specifically, each JVM thread has a private JVM stack, created at the same time as the thread. A JVM stack stores frames, holds local variables and partial results, and plays a part in method invocation and return. A frame is thus used to store data and partial results, as well as to perform dynamic linking, return values for methods, and dispatch exceptions. A new frame is created each time a method is invoked. A frame is destroyed when its method invocation completes, whether that completion is normal or abrupt (it throws an uncaught exception). Frames are allocated from the JVM stack of the thread creating the frame. Each frame has its own array of local variables, its own operand stack, and a reference to the runtime constant pool of the class of the current method.

The heap or memory allocation pool is garbage collected. The heap is the runtime data area from which memory for all class instances and arrays is allocated. The heap is created on virtual machine start-up, and heap storage for objects is reclaimed by an automatic storage management system known as a garbage collector. Specifically, each program running in the Java runtime environment has a garbage-collected heap assigned to it. Moreover, each class in the heap has a constant pool associated with it. Because constants do not change, they are usually created at compile time. Items in the constant pool encode all the names used by any method in a particular class. The class contains a count of how many constants exist, and an offset that specifies where a particular listing of constants begins within the class description.

The method area stores byte code instructions that are associated with methods in the compiled code, and a symbol table which the execution environment needs for dynamic linking Any debugging or additional information that might need to be associated with a method is stored in this area as well. The program counter always points to, e.g., contains the address of, some byte in the method area. The program counter is used to keep track of the thread of execution. After a byte code instruction has been executed, the program counter will contain the address of the next instruction to execute.

The method area is shared among all JVM threads, and stores per-class structures such as the runtime constant pool, field and method data, and the code for methods and constructors, including the special methods used in class and instance initialization and interface type initialization. The method area is created on virtual machine start-up. A runtime constant pool is a per-class or per-interface runtime representation of the constant_pool table in a class file. It contains several kinds of constants, ranging from numeric literals known at compile time, to method and field references that must be resolved at run time. Each runtime constant pool is allocated from the JVM's method area. The runtime constant pool for a class or interface is constructed when the class or interface is created by the JVM.

Figure 8B:
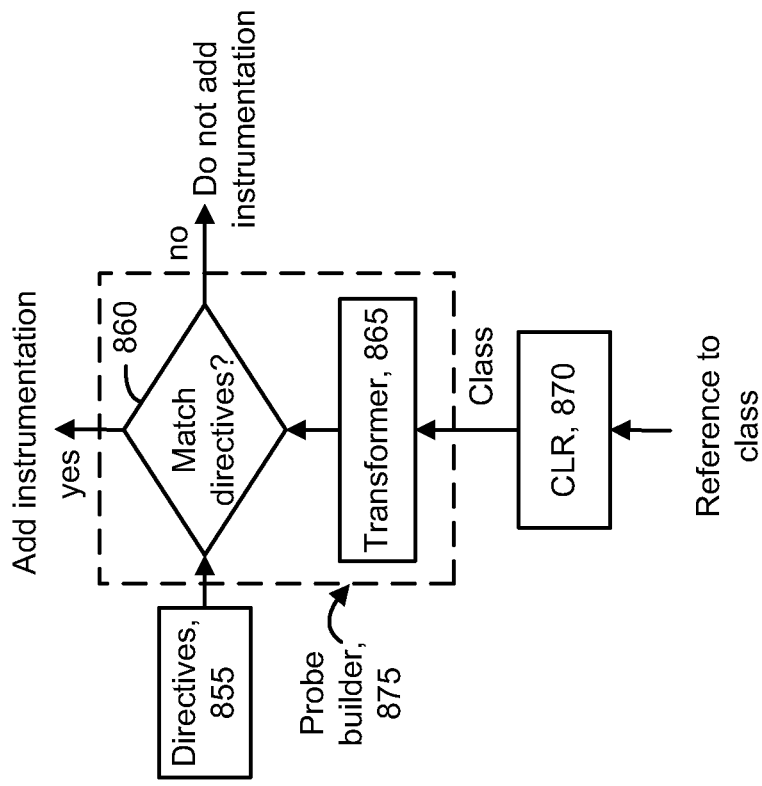
FIG. 8B depicts a .NET-based example process flow for static instrumentation.
Figure 8A:
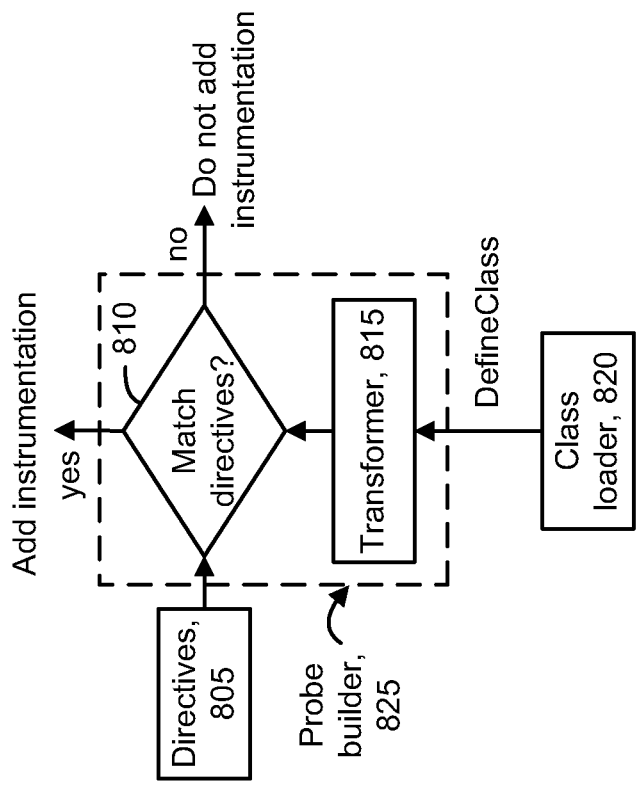
FIG. 8A depicts a JAVA-based example process flow for static instrumentation.

FIG. 8A depicts a JAVA-based example process flow for static instrumentation. The process may be implemented by an agent, such as depicted in FIG. 1, in one possible approach. One approach to instrumentation involves providing static rules which determine which components, such as methods, are to be instrumented. The rules are accessed, e.g., from one or more configuration files, at the time the components are loaded into the application. In such an approach, a class loader 820 is used to provide raw data bytes of an application byte code to a transformer 815, which transforms the raw bytes into a class, for instance. For example, in JAVA, this may involve using the method defineClass of the ClassLoader object, which is responsible for loading classes. The class ClassLoader is an abstract class. Given the name of a class, a class loader should attempt to locate or generate data that constitutes a definition for the class. A typical strategy is to transform the name into a file name and then read a "class file" of that name from a file system. The method defineClass converts an array of bytes into an instance of class Class. Instances of the class Class represent classes and interfaces in a running JAVA application. The transformer 815 is thus software which can transform byte code to add instrumentation, such as by transforming classes. In one approach, the minimum unit of processing of the transformer 815 is a class file and its byte array.

If the application byte code matches rules (directives) 805 at a decision block 810, the transformer 815 adds probes in the form of tracer byte code. If the application byte code does not matches the rules 805 at the decision block 810, the transformer 815 does not add instrumentation to the byte code. The transformer 815 and the decision block 810 may be considered to be part of a probe builder 825.

In this implementation, the rules 805 are a set of typically static rules that identify portions of the managed application which are to be instrumented. The rules are usually implemented when a class is defined in a virtual machine for the first time. A class can be loaded multiple times while being defined only once. For example, there can be multiple class loaders loading the same class. Further, components such as classes may be instrumented based on whether they are named a certain way, whether they implement a certain interface, whether they extend a certain subclass or super class, and so forth. Such components are selected to be instrumented because it is believed they might provide performance data which is useful or otherwise interesting.

For instance, a rule may indicate that all servlets should be instrumented since it is believed that at least some of the servlets may provide interesting data. In this case, the rules 805 may indicate that all components that are subclasses of the JAVA class HttpServlet should be instrumented. HttpServlet is an abstract class from which all servlets depend. However, not all components can be instrumented, and there is a tension in that over-inclusive instrumentation results in excessive overhead costs and possibly impairing the operation of the application, while under-inclusive instrumentation results in the omission of important performance data.

FIG. 8B depicts a .NET-based example process flow for static instrumentation. In another possible approach, the components of the managed application are provided according to the MICROSOFT CORP. ".NET" Framework. Unlike JAVA, the .NET framework does not use class loaders. Instead, .NET includes a virtual machine that manages the execution of programs written specifically for the framework. The runtime environment of the .NET framework is known as the Common Language Runtime (CLR). The CLR provides the appearance of an application virtual machine so that programmers need not consider the capabilities of the specific CPU that will execute the program. The CLR also provides other services such as security, memory management, and exception handling. A class library of pre-coded solutions and the CLR together compose the .NET Framework.

Moreover, the CLR is an implementation of a Common Language Infrastructure (CLI) which provides a language-neutral platform for application development and execution, including functions for exception handling, garbage collection, security, and interoperability. The CLI includes the core class libraries, Common Type System, and the Common Intermediate Language (CIL). As with JAVA byte code, CIL is another example of intermediate byte code. JAVA and .NET provide example implementations only, as other implementations are possible.

Here, the process may be implemented by an agent, in one possible approach. In one possible scenario, some process in the .NET framework references a class by name, and the CLR 870 finds the class, shows it to a transformer 865 (if any) and uses the resultant CIL. In particular, if the class matches rules 855 at a decision block 860, instrumentation is added. If the class does not match the rules 855 at the decision block 860, instrumentation is not added. The transformer 865 and the decision block 860 may be considered to be part of a probe builder 875.

FIG. 9 depicts a user interface display which indicates a hierarchical relationship among components, and corresponding performance data. The user interface 900 includes a display region 904 which identifies the names of one or more instrumented components, and a dependency relationship, such as in FIG. 5. The user can select one or more components in the display region 904 to display performance data, e.g., a trace, for that component based on its instrumentation, in a display region 906. The traces are based on FIG. 6 in this example. The display region 904 can be automatically populated with each of the components in the application using a hierarchical structure such as a tree which shows which components are under, or called by, another component. The display region 906 depicts performance data such as transaction traces of the instrumented components based on the instrumentation, for selected ones of the components in the region 904. The region 906 can be populated with performance data provided from an agent to a manager.

FIG. 10 depicts relationships among different software components in a computing system in which an agent creates a helper object to access a method of an application. Generally, a solid arrow indicates that a component at the tail of the arrow is defined from the component at the head of the arrow. A dashed arrow indicates that a component at the tail of the arrow can access the component at the head of the arrow.

For byte code running in a JVM, there is the concept of dynamic linking of the code to classes which are loaded by class loaders. The code needs to have access to the class loader that loaded a class to have this link. However, in some cases we do not have access to the class of an object of an application and therefore cannot perform the dynamic linking and casting of the object. This can happen in different situations. For, an object may be received at a computing system on a communication path as an unknown stream of bytes. This can happen in the case of an agent, for instance, when we have a byte code modification and the agent intercepts the method of the user that has this object. The agent knows that it is an object but does not have access to the class of the object. The object itself knows its class. The agent can essentially ask the object, "What is your class?," using the Reflection API, and the object can report its class to the agent. However, as mentioned, this process is slow. In the case of a managed application, it is important to minimize the processing overhead of the instrumentation.

The problem is that the agent does not have access to the class loader mechanism of the class of the object. Thus, we have a piece of JAVA code which is an object, and we can always have a reference to an object inside a JVM. In order to do casting and dynamic linking of the object, the agent needs to have access to the class of that object through the class loader mechanism of the object. If the object does not have this access, the object cannot invoke a method in that object because the JVM will not allow it.

The agent does not normally have this access due to the location of the agent. The left-hand part of FIG. 10 shows an example class loader hierarchy of class loaders which set up for an application server. Specifically, the Bootstrap ClassLoader 1000 is the parent of all classloaders and loads the standard JAVA Development Kit (JDK) classes in the library directory of JRE. All the java.* classes are loaded by this ClassLoader. The Bootstrap ClassLoader loads the System ClassLoader 1002, which in turn loads code found on java.class.path. By default, all user classes are loaded by the default System ClassLoader. The System ClassLoaderloads the Common ClassLoader 1004, which is common to multiple application ClassLoaders such as WebApp1 ClassLoader 1008 and WebApp2 ClassLoader 1006. Using the Common ClassLoader makes an application or module accessible to all applications or modules deployed on servers that share the same configuration. Each application ClassLoader can define one or more classes which in turn can each define one or more objects. As discussed in connection with FIG. 8A, the method defineClass converts an array of bytes into an instance of class Class. For example, WebApp1 ClassLoader defines and loads WebApp1 class 1010, and WebApp1 class creates WebApp1 Object 1012, a specific object which is cast on the application.

When a class is loaded by the application ClassLoader, the application ClassLoader can also add instrumentation to the class. Instrumentation may be added statically through the Probe Builder or dynamically through an "AutoTransformer." The dynamic approach uses the Java API "java.lang.Instrument" or Java Dynamic Instrumentation. In both cases, the agent object itself is not controlling the instrumentation process. The agent code only calls the JAVA instrumentation API in the dynamic case to activate the (auto)transformer. In the static case, the agent code does not directly interact with the probe builder, in one approach. The instrumentation added to the WebApp1 class says: "call one method in the agent class." The agent is activated the first time by a method call from the code that is instrumented.

The applications are web-based as an example, but this is not required. From the perspective of the provider of the agent as part of application management software, a managed application is sometimes referred to as a customer application.

An agent class 1014 is defined by the Bootstrap ClassLoader 1000 using the method defineClass. The agent class in turn defines an agent object 1018. There may be only one agent object in the JVM, in one approach. The agent object and class sit on the Bootstrap ClassLoader and are therefore visible to all other objects in the JVM. Instrumented application objects can therefore call the agent to say "start trace" and "end trace," for instance.

If an object is of any type, and from any class that is loaded by a class loader other than the Bootstrap ClassLoader, the agent is not able to cast the object because the agent does not see those class loaders. For example, the agent does not see the WebApp1 ClassLoader so it cannot cast the object 1012.

The agent cannot see the class loaders below the Bootstrap ClassLoader because the agent is loaded by the Bootstrap ClassLoader.

Let's say the agent wants to cast to a class called XYZ. The agent will look for the class in any accessible location. It will look at the hierarchy of classes, and all the parents for the class XYZ to see if it can link the class. But the agent only has Bootstrap ClassLoader as a parent. So, if the object is of a class which is under the Bootstrap ClassLoader, the agent cannot access it. The Reflection API is a mechanism to circumvent this problem. Using it, the agent asks the object: What is your class? and the object responds: XYZ. So, the agent calls the class object and asks the class object to call the method object and asks the method object to invoke to get an object value.

A better approach uses a combination of instrumentation and classloader APIs to allow the agent to safely and directly invoke methods on the application objects or on objects passed by reference by the application. In this approach, application objects are instrumented to invoke a method in an agent shim 1016 using a static call. A shim can be a small library which transparently intercepts an API, changes the parameters passed, handles the operation itself, or redirects the operation elsewhere. The instrumentation of the application object allows the agent code to have a reference to the invocation object as well as all objects that are parameters to the method calling the agent. The agent identifies if invocation of methods on any of these objects is required. The decision of when it is necessary to invoke methods of the application object can be delegated to specific tracer business logic. For example, it may be necessary to access an API in the object to retrieve an identifier for tracing. The business logic can be either hard coded or based on rules. The agent can determine that the object traced is actually one to invoke the method in a variety of ways, including trial and error, or based on the specific position of a given tracer in the code of the user by examining the class that instanced the object.

If the agent desires to invoke a method of the application, it attempts to fetch a specific helper object from a map repository 1026, e.g., at least one file such as a JAR file. The keys of the maps are classloaders; the element, helper objects. The classloader passed as a key in the fetch request is the classloader (e.g., WebApp1 ClassLoader, 1008) of the class of the application of the object that the agent wants to invoke one or more methods on. If the helper object has previously been created, byte code of both the helper object and the helper class are present in the repository 1026 and can be retrieved. If the helper object is not found, a new one is created. To create a helper object, the agent code creates an agent plugin ClassLoader 1020 and uses it to define a helper class 1022. This happens once for an application, after which the byte code is cached and can be subsequently accessed.

The agent identifies the class that will create a helper instance object, and gets byte code 1028 of this class as an array of bytes from a JAR file in the repository 1026. The agent code (agent class 1014) creates a new instance of a special classloader, Helper ClassLoader 1030. This happens for each different ClassLoader of the monitored application on which the agent may need to invoke a method. The Helper ClassLoader 1030 overrides the findClass method of java.lang.ClassLoader so that it will use the cached array of bytes to define a class if it is requested to do so for the helper class. The new Helper ClassLoader 1030 is created with the ClassLoader 1008 of the application set as its parent. The agent code identifies the ClassLoader 1008 of the application based on a reference to an object of the application which is received from instrumentation of the application.

The Helper ClassLoader is then requested to load the Helper class 1032 (using Class.forName("helperClass", true, HelperClassLoader) API. This forces the Helper ClassLoader to define the Helper class 1032 using the byte array. A new instance of the helper object 1034 is created, using the Reflection API to create the helper object 1034 from the class 1032 retrieved with the previous method. The helper object 1034 is put in the map repository 1026, along with the helper class 1032, with the application ClassLoader 1008 as the key. That is, the helper class and helper object are indexed to the application ClassLoader.

If the agent object needs to invoke multiple different methods on one application object, such as WebApp1 1012, one helper object can be used. Different methods in the same class are defined using the same classloader, and can therefore be invoked using the same helper object. Generally, one helper object can be used to invoke methods on different objects in different classes defined under the same ClassLoader (such as WebApp1 ClassLoader). A second helper object would be used to invoke methods on different objects in different classes defined under another ClassLoader (e.g., WebApp2 ClassLoader).

The approach allow the helper object 1034 to safely cast the objects/methods of the application. The helper, in fact, is using a classloader 1030 that has as parent the classloader 1008 of the customer application: every class that the helper is requesting from its Helper ClassLoader 1030 is coming from the classloader 1008 of the application code.

In summary, we have an agent class loaded by the Bootstrap ClassLoader, where the agent class has a reference to an agent plug-in class loader which can define a helper class from an agent plug-in JAR file. We can always create a class using a JAR file to load the class in memory using a plug-in class loader. This infrastructure allows us to get access to the byte code of the helper class. The byte code of the helper class is contained in the JAR file as a set of bytes and can be extracted from the JAR file by the Helper ClassLoader. Moreover, there is an application object (WebApp1object) that was created by class (WebApp1 class) that was loaded by a class loader (WebApp1 ClassLoader). A reference or handle to this application is held by the agent object 1018 due to byte code instrumentation of the application object. That is, the application object is accessible to the agent object through the instrumentation. The object on the agent can do some work with data that is received via the instrumentation.

In order to cast the application object, the agent creates a new plug-in class loader which has access to the helper class byte code because the helper class loader is created by the agent object. The agent has access to the byte code through the JAR file. The helper class loader is set up to have the same parent as the parent of the application object to which the agent object has a handle. Because the agent object has a handle to the application object, it has a handle to the class of the application object. Because the agent object has a handle to the class of the application object, it knows the class loader of the class of the application object. Because it knows the class loader, it knows the parent of the class loader of the class of the object. The agent has a handle to the application object which has been passed to the agent object through instrumentation. Because it has a handle to the object, it can call a method of the application object.

The agent can perform a command such as "class dot get class loader" to obtain a handle to the class loader. The class loader can use a "get parent" command that will provide the parent class loader.

The agent can thus ask the helper class loader to create a helper class and create a helper object out of that helper class.

We can create the helper class because we have the byte code. The JVM is passed byte code to create classes in JAVA. If we have a class that is compiled in byte code we can pass the byte code in to create a class. The helper class is a bona fide class which can create the helper object. This helper object is important because the agent can see it. The agent has a handle to the helper class loader which has a handle to the helper class which has a handle to the helper object. The agent thus knows all about the helper object and can make a direct call to it. Because of the parent relationship of the application class loader 1008 to the helper class loader 1030, the agent object can see all of these classes loaded by the application class loader 1008 and call a method on the application objects of thee classes using a command such as "do C of O dot do." The agent can thus do a casting of the application objects.

The agent can say "cast O to class C" and then invoke the method "do." This is fast because it is strong typed. We create an object from a class in a class loader, that has as a parent the class loader that loaded the object that it wants to cast. Studies indicate that the time required to invoke an API/method of the application can be cut by more than about a third with this approach.

As mentioned, the invocations of the application methods by the helper object 1034 use the faster and more efficient strong-type casting rather than weak-type Reflection API. As an example for weak and strong-typed method calls in JAVA, consider a class C such as:

```
public class C{
    public void doSomething( ){ }
}
One example of strong-type method call is:
public void startTrace(Object o){
    C objectOfTypeC = (C)c; // this is casting
    c.doSomething( ); // this is a strong-typed invocation }
Another example of direct casting is: ((HttpServletRequest)object).getRequestURI ( ).
One example of soft-typed invocation (through the Reflection API) is:
public void startTrace(Object o){
    Class classc = o.getClass( );
    Method methodDoSomething = classc.getMethod("doSomething");
    methodDoSomething.invoke( ); // this is a weak-typed invocation }
"Method" is one of the Reflection classes, which are found in the package
"java.lang.reflect," which provides classes and interfaces for obtaining
reflective information about classes and objects.
```

To perform casting, we need to be able to access class C from the object doing the invocation. But the agent object is not in general able to do so, because, as discussed, it is defined from the Bootstrap ClassLoader and therefore does not see all the classes that the application classloader (1008) sees. The agent object is required to be defined from the Bootstrap ClassLoader so that the methods of the applications that are bytecode instrumented can see the agent.

Example code of the helper object 1034 is as follows:

```
class Helper{
    void invokeOnC(Object o){
        C c = (C)o;
        c.doSomething( ); // this is strong-typed, therefore fast. The helper
can see the class C because of the way it is created.
}
Example code of the agent can be:
public void startTrace(Object o){
    Object helper = getHelper(o.getClass( ).getClassLoader( ));
    (Helper)helper.invokeOnC(o); // this is fast.
}
```

A more specific implementation of the helper includes a ByteCode ClassLoader (FIG. 12A) and a ClassLoaderHelper (FIGS. 12B and 12C).

FIG. 11A depicts a process corresponding to FIG. 10 in which an application and an agent have a common Bootstrap ClassLoader. Refer also to FIG. 10. In one approach, these steps occur when an application is initially loaded into a JVM and begins executing, and before the agent determines that it needs to invoke a method of an application. The steps performed in this and other flowcharts need not necessarily be performed in the specific order shown or as discrete steps.

At step 1100, the Bootstrap ClassLoader 1000 loads the System ClassLoader 1002. At step 1102, the System ClassLoader 1002 loads the Common ClassLoader 1004. At step 1104, the Common ClassLoader 1004 loads Application ClassLoaders such as WebApp1 ClassLoader 1008 and WebApp2 ClassLoader 1006. At step 1106, the Application ClassLoaders such as WebApp1 ClassLoader load one or more classes of the application, such as WebApp1 class 1010. At step 1108, an Application class such as WebApp1 class 1010 creates an object of the application such as WebApp1 object 1012. At step 1110, an object of the application such as WebApp1 object passes a reference to itself to an object of the agent, such as agent object 1018 via agent shim 1016. In a separate path, at step 1112, the Bootstrap ClassLoader loads a class 1014 of the agent. At step 1114, the agent class creates an object 1018 of the agent. The agent does not have a direct class loader connection with the application object because the agent class and the application class ultimately rely on the same Bootstrap ClassLoader for their creation.

FIG. 11B depicts a process corresponding to FIG. 10 in which an agent creates and uses a helper object to access a method of an application. Refer also to FIG. 10. In one approach, these steps occur after an application has been loaded into a JVM and begins executing, and when the helper object code is not available in a repository and must be created before it is used. At step 1120, the object 1018 of the agent determines that it is necessary to invoke one or more methods of an application. As mentioned, the decision of when it is necessary to invoke methods of the application object can be delegated to specific tracer business logic, or instance. At decision step 1122, the object of the agent creates an agent plug-in ClassLoader 1020. At step 1124, the agent plug-in ClassLoader defines a helper class 1022 (e.g., by creating its byte code). At step 1126, the object 1018 of the agent identifies the class loader such as WebApp1 ClassLoader 1008 of the object of the application from the reference (step 1110, FIG. 11A). The class loader of the object of the application is the class loader of the application in general, for all its objects, in one approach.

At step 1128, the agent plug-in ClassLoader stores the byte code of the helper class in at least one file (such as in repository 1026), indexed to the ClassLoader 1008 of the object of the application which the helper class will use to assist in invoking. At step 1130, the agent class 1014 creates a helper ClassLoader 1030, and sets its parent ClassLoader as the ClassLoader (such as WebApp1 ClassLoader 1008) of the object of the application. At step 1132, the helper ClassLoader 1030 uses the byte code 1028 of the helper class to define the helper class 1032. At step 1134, the helper class defines a helper object 1034. Step 1136 stores byte code of the helper object with the byte code of the helper class in at least one file, so that both are cross-referenced to the ClassLoader of the application (e.g., WebApp1 ClassLoader). At step 1138, the helper object invokes a method of the object of the application (such as WebApp1 object 1012) using the common parent ClassLoader such as WebApp1 ClassLoader 1008.

FIG. 11C depicts a process corresponding to FIG. 10 in which an agent uses a previously-created helper object to access a method of an application. Refer also to FIG. 10. In one approach, these steps occur after an application has been loaded into a JVM and begins executing, and when the helper object code is available in a repository and can be retrieved and used directly instead of being created. At step 1150, an object 1018 of the agent determines that it is necessary to invoke one or more methods of the object 1012 of the application. At step 1152, the object 1018 of the agent identifies the class loader such as WebApp1 ClassLoader 1008 of the object of the application from the reference (step 1110, FIG. 11A). At step 1154, the agent class 1014 creates a helper ClassLoader 1030, and sets its parent ClassLoader as the ClassLoader (such as WebApp1 ClassLoader 1008) of the object of the application. At step 1156, the helper ClassLoader retrieves previously created byte code of the helper class and of the helper object from at least one file (such as in repository 1026), using the ClassLoader (such as WebApp1 ClassLoader 1008) of the object of the application as a key or index. At step 1158, the helper object invokes a method of the object of the application (such as WebApp1 object 1012) using the common parent ClassLoader such as WebApp1 ClassLoader 1008.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method for accessing an application, the method comprising:

at an agent, receiving a reference to an application object of the application from instrumentation of the application, and identifying a class loader of the application from the reference;

and based on the reference, performing a process which allows the agent to invoke one or more methods of the application object, the performing the process comprising:

determining if byte code of a helper class and byte code of a helper object are in a repository, indexed to the class loader of the application;

if the byte code of the helper class and the byte code of the helper object have previously been created and are present in the repository, indexed to the class loader of the application, retrieving byte code of the helper class and byte code of the helper object from the repository;

if the byte code of the helper class and the byte code of the helper object are not found in the repository, creating a helper class loader and setting a parent class loader of the helper class loader as the class loader of the application, using the helper class loader to obtain and load the byte code of the helper class, using the loaded byte code of the helper class to define the byte code of the helper object, and storing the byte code of the helper class and the byte code of the helper object in the repository, indexed to the class loader of the application;

and invoking the one or more methods of the application object, wherein the agent invokes the one or more methods of the application object by class casting the helper object and invoking the one or more methods of the application object on the helper object casted, without having a direct class loader connection with the application object.

2. The computer-implemented method of claim 1, wherein: the helper class loader is created by a class of the agent.

3. The computer-implemented method of claim 1, wherein: the agent defines the helper class using a plug-in.

4. The computer-implemented method of claim 1, wherein: the agent performs the process in response to determining that it is necessary to invoke the one or more methods of the application object.

5. The computer-implemented method of claim 1, wherein: the helper object is created from the loaded byte code of the helper class using a reflection Application Program Interface (API).

6. The computer-implemented method of claim 1, wherein: the identifying comprises identifying the class of the application from the reference to the object of the application, and identifying the class loader of the application from the class of the application.

7. The computer-implemented method of claim 1, wherein: the reference is passed to the agent by instrumentation of the object of the application.

8. The computer-implemented method of claim 1, wherein: the agent invokes the one or more methods of the application object by dynamically linking to the class of the application in a virtual machine.

9. The computer-implemented method of claim 1, further comprising: storing the byte code of the helper object in at least one file, indexed to the class loader of the application.

10. The computer-implemented method of claim 9, further comprising: performing a process which allows the agent to again invoke one or more methods of the application object, including-^retrieving the helper class and the helper object from the at least one the using the class loader of the application as a key.

11. The computer-implemented method of claim 9, wherein; the at least one the comprises a Java Archive (JAR) file.

12. The computer-implemented method of claim 1, further comprising: creating a helper class loader for each different class loader of a plurality of class loaders of the application on which the agent invokes a method.

13. The computer-implemented method of claim 1, wherein; the helper class loader overrides a findClass method of java.lang.ClassLoader so that the helper class loader uses the loaded byte code of the helper class to define the helper class.

14. The computer-implemented method of claim 1, wherein; the agent does not have the direct class loader connection with the application object because a class of the agent and a class of the application are created by a same parent class loader.

15. The computer-implemented method of claim 14, wherein: the same parent class loader is Bootstrap ClassLoader.

16. A computing device, comprising:
a storage device which stores software instructions;
and a processor associated with the storage device, the processor is configured to execute the software instructions to:
receive, at an agent, a reference to an application object of an application from instrumentation of the application, and identify a class loader of the application from the reference;
determine if byte code of a helper class and a helper object are in a repository, indexed to the class loader of the application;
if the byte code of the helper class and the helper object are in the repository, indexed to the class loader of the application, retrieve the byte code of the helper class and the helper object from the repository;
if the byte code of the helper class and the helper object are not in the repository, create a helper class loader and setting a parent class loader of the helper class loader as the class loader of the application, and use the helper class loader to obtain and load the byte code of the helper class and the helper object from the repository;
and invoke one or more methods of the application object, wherein the agent, to invoke the one or more methods of the application object, class casts the helper object and invokes the one or more methods of the application object on the helper object casted.

17. The computing device of claim 16, wherein:
the processor is configured to execute the software instructions to invoke the one or more methods of the application object by dynamically linking to the class of the application in a virtual machine.

18. The computing device of claim 16, wherein:
the helper class loader overrides a findClass method of java.lang.ClassLoader so that the helper class loader uses the loaded byte code of the helper class to define the helper class.

19. The computing device of claim 16, wherein:
the processor is configured to execute the software instructions to provide an agent which casts to invoke the one or more methods of the application object;
and a class of the agent and a class of the application are created by a Bootstrap ClassLoader.

20. A computer-implemented method for accessing an application, comprising:
at an agent, receiving a reference to an application object of the application from instrumentation of the application, and identifying a class loader of the application from the reference;
creating a helper class loader and setting a parent class loader of the helper class loader as the class loader of the application, responsive to the identifying;
using the helper class loader to obtain and load byte code of a helper class;
using the loaded byte code of the helper class to define a helper object;
and using the helper object, invoking the one or more methods of the application object, wherein the helper class loader overrides a findClass method of java.lang.ClassLoader so that the helper class loader uses the loaded byte code of the helper class to define the helper class, and the agent invokes the one or more methods of the application object by class casting the helper object and invoking the one or more methods of the application object on the helper object casted, without having a direct class loader connection with the application object.

* * * * *